United States Patent [19]
Hellerbach et al.

[11] 3,886,214
[45] May 27, 1975

[54] BENZODIAZEPIN-2-ONES AND PROCESSES FOR THE PREPARATION THEREOF

[75] Inventors: Joseph Hellerbach, Basel, Switzerland; Armin Walser, West Caldwell, N.J.

[73] Assignee: Hoffmann-La Roche Inc., Nutley, N.J.

[22] Filed: July 9, 1973

[21] Appl. No.: 377,880

Related U.S. Application Data

[60] Division of Ser. No. 169,564, Aug. 4, 1971, Pat. No. 3,784,542, which is a continuation-in-part of Ser. No. 10,053, Feb. 9, 1970, abandoned.

[30] Foreign Application Priority Data
Feb. 14, 1969 Switzerland.......................... 2255/69

[52] U.S. Cl... 260/562 N; 260/239.3 D; 260/290 R; 260/562 R
[51] Int. Cl............................................ C07c 103/32
[58] Field of Search................. 260/562 N, 239.3 D

[56] References Cited
UNITED STATES PATENTS
3,415,814   12/1968   Carabaters................... 260/239.3 D Primary Examiner—C. Davis
Attorney, Agent, or Firm—Samuel L. Welt; Bernard S. Leon; Frank P. Hoffman

[57] ABSTRACT

1-substituted benzodiazepin-2-ones, derivatives thereof, and processes for the preparation of same are described. These compounds are useful as anticonvulsants, muscle relaxants and sedatives.

2 Claims, No Drawings

BENZODIAZEPIN-2-ONES AND PROCESSES FOR THE PREPARATION THEREOF

This is a division of application Ser. No. 169,564 filed Aug. 4, 1971, now U.S. Pat. No. 3,784,542, which in turn is a continuation-in-part of application Ser. No. 10,053 filed Feb. 9, 1970, and now abandoned.

DESCRIPTION OF THE INVENTION

The present invention relates to novel chemical compounds and to processes for the preparation thereof, said compounds having valuable therapeutic properties. More particularly, the present invention is concerned with new benzodiazepine derivatives of the general formula

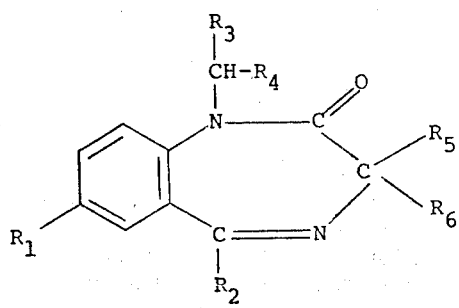

I wherein $R_1$ signifies halogen or nitro; $R_2$ signifies phenyl, mono-halo phenyl or pyridyl; $R_3$ signifies hydrogen, lower alkyl, hydroxy lower alkyl, halo lower alkyl, carbalkoxy, mono-lower alkylamino-lower alkyl, dilower alkylamino-lower alkyl or acyloxy-lower alkyl; $R_4$ signifies lower alkoxy, halo-lower alkoxy, amino-lower alkoxy, mono-lower alkylamino-lower alkoxy, dilower alkylamino-lower alkoxy, hydroxy-lower alkoxy, alkoxy-lower alkoxy, lower alkylthio, lower alkylsulfinyl or lower alkylsulfonyl; $R_5$ signifies hydrogen or hydroxy; $R_6$ signifies hydrogen or carbalkoxy; and where, in the case that $R_5$ signifies hydrogen, the nitrogen atom in the 4-position can carry an oxygen atom as well as the pharmaceutically acceptable salts thereof.

As used herein, either alone or in combination, the term "lower alkyl" comprehends straight or branched chain hydrocarbon groups having from 1 to 7 carbon atoms, preferably from 1 to 4 carbon atoms, such as methyl, ethyl, propyl, isopropyl and the like. The term "acyl", used either alone or in combination, comprehends alkanoyl groups such as acetyl, propionyl, tert. butyryl and the like; cycloalkanecarbonyl groups such as cyclopropane carbonyl and the like; aroyl or aralkanoyl groups such as benzoyl, phenacetyl, phenylpropionyl and the like which may carry methoxy substituents. The term "halogen" represents all four forms thereof, i.e. fluorine, chlorine, bromine and iodine, unless expressly indicated otherwise. The term "lower alkoxy" designates straight or branched chain saturated hydrocarbonoxy groups containing from 1 to 7 carbon atoms, preferably from 1 to 4 carbon atoms, such as methoxy, ethoxy, propoxy and the like. The expression "halo-lower alkoxy" includes mono as well as di- and tri-halo-lower alkoxy groups.

A preferred class of compounds falling within the scope of formula I are those wherein $R_1$ signifies chlorine or nitro, $R_2$ is phenyl, or mono-halo phenyl with the halogen atom preferably being chlorine or fluorine and positioned in the 2-position of the phenyl ring, and $R_5$ and $R_6$ are hydrogen, i.e. compounds of the formula

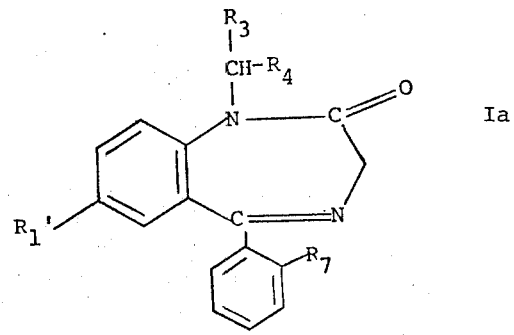

Ia wherein $R_1'$ is chlorine or nitro; $R_7$ is hydrogen or halogen, preferably fluorine or chlorine, and $R_3$ and $R_4$ are as described above.

Another preferred class of compounds falling within the scope of formula I are those wherein $R_1$ signifies chlorine or nitro; $R_2$ signifies phenyl or monohalo phenyl, wherein the halogen atom is preferably chlorine or fluorine and is positioned in the 2-position of the phenyl ring; $R_5$ and $R_6$ signify hydrogen; $R_3$ signifies hydrogen or lower alkyl, preferably methyl; and $R_4$ signifies lower alkoxy, i.e., compounds of the formula

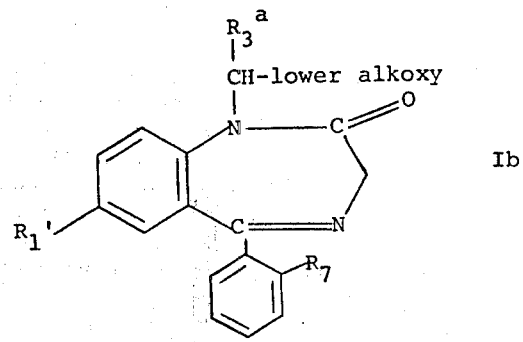

Ib wherein $R_1'$ and $R_7$ are as described above; and $R_3''$ signifies hydrogen or lower alkyl, preferably methyl.

When the $R_3$ substituent is an acyloxy-lower alkyl group, acyloxy methyl is preferred, with the acyl group preferably being acetyl, cyclopropionyl, tert. butyryl and the like.

Most preferred of the compounds of formula I are: 7-nitro-5-phenyl-1-methoxymethyl-1,3-dihydro-2H-1,4-benzodiazepin-2-one; 7-nitro-5-phenyl-1-ethoxymethyl-1,3-dihydro-2H-1,4-benzodiazepin-2-one; 7-nitro-5-phenyl-1[(2-chloroethoxy)methyl]-1,3-dihydro-2-H-1,4-benzodiazepin-2-one and 7-chloro-5(2-fluorophenyl)-1-methoxymethyl-1,3-dihydro-2H-1,4-benzodiazepin-2-one.

The present invention is additionally concerned with new benzodiazepine derivatives of the general formula

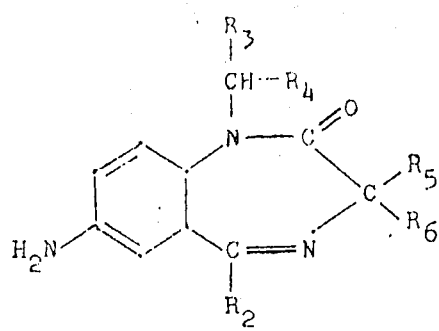

wherein $R_2$, $R_4$, $R_5$ and $R_6$ are as described above.

Preferred among the compounds falling within the scope of formula I' are those wherein $R_2$ is phenyl, or mono-halo phenyl with the halogen atom being chlorine or fluorine and positioned in the 2-position of the phenyl ring, and $R_5$ and $R_6$ are hydrogen, i.e. compounds of the general formula

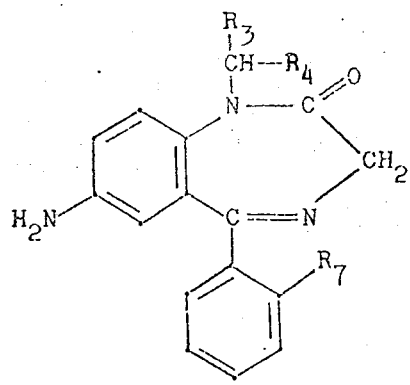

wherein $R_3$, $R_4$ and $R_7$ are as described above.

Within the scope of formula I'', compounds wherein $R_3$ signifies hydrogen or lower alkyl, suitably methyl, and $R_4$ signifies lower alkoxy, suitably methoxy, are most preferred, especially 7-amino-1,3-dihydro-1-methoxymethyl-5-phenyl-2H-1,4-benzodiazepin-2-one.

The novel compounds of formula I can be prepared following a variety of synthetic routes.

A. In one such process, a compound of the general formula

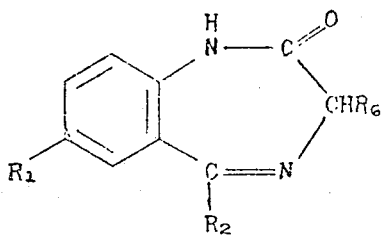

wherein $R_1$, $R_2$ and $R_6$ are as described above, or a 4-oxide thereof, in case $R_6$ represents hydrogen is reacted with a compound of the general formula

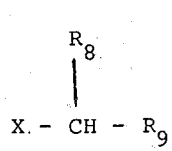

wherein $R_8$ signifies hydrogen, lower alkyl, halo-lower alkyl, acyloxy-lower alkyl or carbalkoxy; $R_9$ signifies lower alkoxy, halo-lower alkoxy, lower alkylthio or alkoxy-lower alkoxy; and X signifies any suitable leaving group, preferably halogen, mesyloxy or tosyloxy to yield a compound of the formula

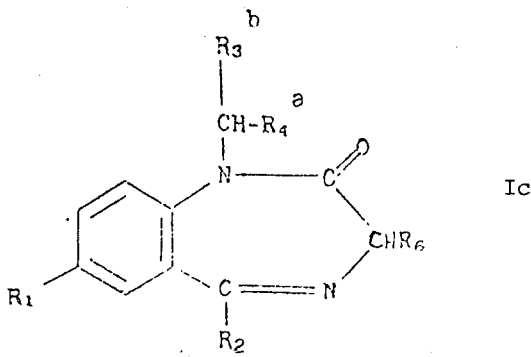

wherein $R_3{}^b$ is hydrogen, lower alkyl, halo-lower alkyl, acyloxy-lower alkyl or carbalkoxy; $R_4{}^a$ is lower alkoxy, halo-lower alkoxy, lower alkylthio or alkoxy-lower alkoxy; $R_1$, $R_2$ and $R_6$ are described above, or the 4-oxide thereof in case $R_6$ represents hydrogen.

The reaction of a compound of formula II or a 4-oxide thereof in case $R_6$ represents hydrogen with a compound of formula III to prepare a compound of formula Ic above can be carried out in the presence of an inert organic solvent or mixtures of inert organic solvents. Suitable inert organic solvents for the purposes of this aspect of the present invention are hydrocarbons such as benzene, toluene, and the like, ethers such as dioxane, tetrahydrofuran and the like, alcohols such as tertiary butanol and the like, and dimethylformamide. This reaction is expediently carried out within a temperature range of about −50° to about 120°C. Further, it is expedient to first transform a compound of formula II into the 1-alkali metal derivative thereof before the reaction with the compound of formula III. This 1-alkali metal derivative can, for example, be manufactured with the aid of a lower alkali alcoholate such as sodium methylate, an alkali metal hydride such as sodium hydride, an alkali metal amide such as sodium amide and similar reagents. Alternately, the reaction of a compound of formula II with a compound of formula III can also be effected in the presence of a base such as an alkali hydroxide, for example sodium hydroxide, or triethylamine. The compounds of formula II and III above are known and conveniently available classes or materials and can be prepared following conventional techniques.

B. In a further process aspect of the present invention, a compound of the general formula

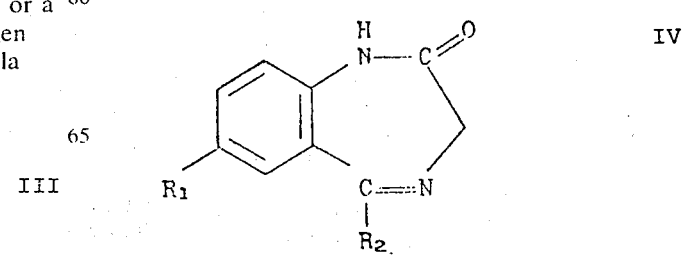

wherein $R_1$ and $R_2$ are as described above
is reacted with a vinyl ether of the general formula $$CH_2 = CH - O \text{ lower alkyl} \qquad V$$

to yield compound of formula I wherein $R_3$ is methyl and $R_4$ is lower alkoxy, i.e., a compound of the formula

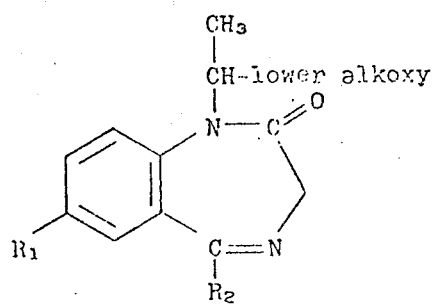

wherein $R_1$ and $R_2$ are as described above.

The reaction of compound of formula IV with a vinyl ether of formula V to yield a compound of formula Id above is expediently carried out in the presence of an inert organic solvent. Suitable inert organic solvents for this purpose include hydrocarbons such as benzene, toluene and the like and chlorinated hydrocarbons such as chloroform and the like. Further, this reaction is expediently carried out in the presence of an acid catalyst such as glacial acetic acid. Temperatures in the range of from about room temperature to about 150°C are suitable for the purposes of this reaction. The compounds of formulae IV and V above are known and conveniently available classes of materials and can be prepared following conventional techniques.

C. In a further process aspect of the present invention, a compound of the formula

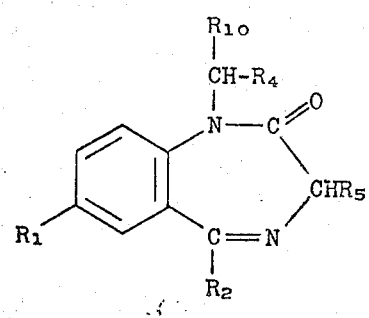

wherein $R_1$, $R_2$, $R_4$ and $R_5$ are as described above and $R_{10}$ signifies hydrogen, lower alkyl, hydroxy-lower alkyl, halo-lower alkyl, acyloxy-loweralkyl, mono-lower alkylamino-lower alkyl or di-lower alkylamino-lower alkyl, at least one of the $R_4$ and $R_{10}$ substituents being a mono-halo-lower alkoxy or mono-halo-lower alkyl group, and where, in the case where $R_5$ signifies hydrogen, the nitrogen atom in the 4-position can carry an oxygen atom is reacted with a mono-lower alkylamine or di-lower alkylamine to yield a compound of formula

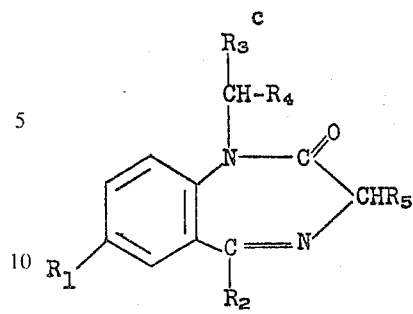

wherein $R_1$, $R_2$, $R_4$ and $R_5$ are as described above, and $R_3{}^c$ is hydrogen, lower alkyl, hydroxy-lower alkyl, halo-lower alkyl, acyloxy-lower alkyl, mono-lower alkylamino-lower alkyl or di-lower alkylamino-lower alkyl, and where at least one of $R_3{}^c$ or $R_4$ is a mono-lower alkylamino-lower alkyl or mono-lower alkylamino-lower alkoxy group, and where, in the case that $R_5$ signifies hydrogen, the nitrogen atom in the 4-position can carry an oxygen atom.

The reaction of a compound of Formula VI with a mono-lower alkylamine or a di-lower alkylamine can be carried out in the presence of an inert organic solvent. Suitable inert organic solvents for this process aspect of the present invention include ethers such as dioxane and the like, hydrocarbons such as benzene, toluene and the like, ketones such as acetone, methyl ethyl ketone and the like and dimethylformamide. The temperature and pressure employed are not critical to the successful performance of this process aspect. Thus, the reaction can be conducted at about room temperature or at elevated temperatures and/or under pressure.

D. A further process aspect of the present invention involves the alkylation of a compound of the formula

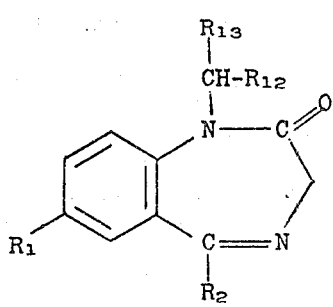

wherein $R_1$ and $R_2$ are as described above; $R_{12}$ signifies lower alkoxy, amino-lower alkoxy, mono-lower alkylamino-lower alkoxy, di-lower alkylamino-lower alkoxy, alkoxy-lower alkoxy or lower alkyl-thio; $R_{13}$ signifies hydrogen, lower alkyl, mono-lower alkylamino-lower alkyl, di-lower alkylamino-lower alkyl or amino-lower alkyl, at least one of $R_{12}$ and $R_{13}$ being an amino-lower alkoxy, mono-lower alkylamino-lower alkoxy, amino-lower alkyl or mono-lower alkylamino-lower alkyl group, or corresponding 4-oxide thereof
to yield a compound of the formula

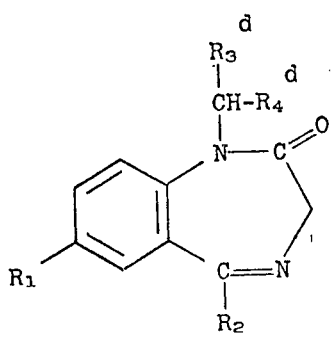

If wherein $R_1$ and $R_2$ are as described above; $R_3{}''$ signifies hydrogen, lower alkyl, mono-lower alkylamino-lower alkyl, di-lower alkylamino-lower alkyl; $R_4{}''$ signifies lower alkoxy, mono-lower alkylamino-lower alkoxy, di-lower alkylamino-lower alkoxy, alkoxy-lower alkoxy, or lower alkylthio, at least one of $R_3{}''$ or $R_4{}''$ being a mono-lower alkylamino-lower alkoxy, di-lower alkylamino-lower alkoxy, mono-lower alkylamino-lower alkyl or di-lower alkyl-amino-lower alkyl group, or a corresponding 4-oxide thereof.

The alkylation of a compound of formula VII above to yield a compound of formula IF above can be carried out following a variety of conventional alkylation techniques. For example, the alkylation may be effected by reductive alkylation, using, preferably Raney Nickel in methanol. For this reaction, temperature and pressure are not critical. Thus, the reaction can be conducted at room temperature although temperatures above and and below room temperature can also be employed. In addition, the alkylation of a compound of formula VII can be effected with an alkyl halide such as methyl iodide and the like. This reaction is expediently carried out at temperatures from about room temperature to about 120°C and in the presence of organic solvents such as dioxane, dimethylformamide, alcohols i.e. ethanol, or hydrocarbons i.e. benzene, toluene and the like. The reaction can also be carried out using elevated pressure.

E. The compounds of formula I wherein at least one of $R_3$ or $R_4$ is mono-lower alkylamino-lower alkyl or mono-lower alkylamino-lower alkoxy group can be prepared as described above by reacting a compound of formula VI with a mono-lower alkylamine or a di-lower alkylamine. Alternately, these compounds can be prepared by using a protected mono-lower alkylamine or a protected di-lower alkylamine as the reactant. This reaction yields a compound of the formula.

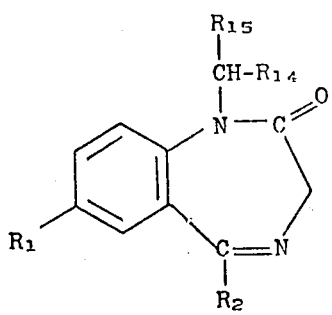

VIII wherein $R_1$ and $R_2$ are as described above; $R_{14}$ signifies lower alkoxy, mono-lower alkylamino-lower alkoxy, di-lower alkyl-amino-lower alkoxy, alkoxy-lower alkoxy, lower alkylthio, or a protected mono-lower alkylamino-lower alkoxy group; $R_{15}$ signifies hydrogen, lower alkyl, acyloxy-lower alkyl, mono-lower alkylamino-lower alkyl, di-lower alkylamino-lower alkyl, or a protected mono-lower alkylamino-lower alkyl group, at least one of $R_{14}$ or $R_{15}$ signifing a protected mono-lower alkylamino-lower alkoxy or mono-lower alkylamino-lower alkyl group, or a corresponding 4-oxide thereof.

The protecting group can then be split off from the compound of formula VIII above to yield a compound of the formula

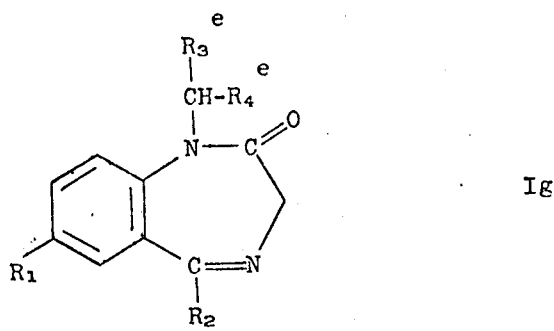

Ig wherein $R_1$ and $R_2$ are as described above; $R_3{}^e$ signifies hydrogen, lower alkyl, acyloxy-lower alkyl, mono-lower alkylamino-lower alkyl, or di-lower alkylamino-lower alkyl; $R_4{}^3$ signifies lower alkoxy, mono-lower alkylamino-lower alkoxy, di-lower alkylamino-lower alkoxy, alkoxy-lower alkoxy, or lower alkylthio, wherein at least one of $R_3{}^e$ or $R_4{}^e$ is a mono-lower alkylamino-lower alkyl or mono-lower alkyl-amino-lower alkoxy group or a corresponding 4-oxide thereof.

Choice of the protecting group used in the formation of a compound of formula VIII and its splitting off is governed by the conditioning factors of the molecule. Suitable protecting groups for this purpose include, for example, carbalkoxy groups such as carbmethoxy, carbethoxy and the like, or carbobenzoxy. The splitting off of the protecting group can be effected by conventional techniques, for example, by alkaline hydrolysis or hydrogenolysis. The alkaline hydrolysis is expediently carried out in the presence of inert organic solvents such as ethers, alcohols and the like and utilizing temperatures from about room temperature to about 100°C. Suitable bases include alkaline or alkaline earth metal hydroxides such as sodium hydroxide, calcium hydroxide and the like. The hydrogenolysis is expediently effected in glacial acetic acid in the presence of palladium and at room temperature, although temperatures above and below room temperature can also be employed.

F. In a further process aspect of the present invention, compounds of formula I wherein at least one of the $R_3$ or $R_4$ substituents carries a hydroxy containing group can be prepared by replacing the aliphatically bound halogen atom of a compound of the general formula

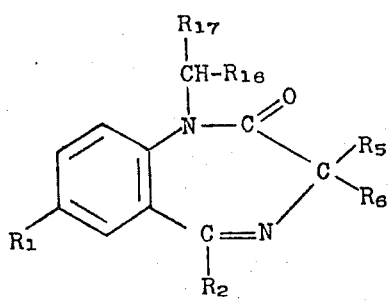

IX wherein $R_1$, $R_2$, $R_5$ and $R_6$ are as described above, and where, in the case that $R_5$ signifies hydrogen, the nitrogen atom in the 4-position can carry an oxygen atom; $R_{16}$ signifies lower alkoxy, mono-halo-lower alkoxy, mono-lower alkylamino-lower alkoxy, di-lower alkylamino-lower alkoxy, hydroxy-lower alkoxy, alkoxy-lower alkoxy, or lower alkylthio; and $R_{17}$ signifies hydrogen, lower alkyl, hydroxy-lower alkyl, mono-halo-lower alkyl, acyloxy-lower alkyl, carbalkoxy, mono-lower alkylamino-lower alkyl, or di-lower alkylamino-lower alkyl at least one of $R_{16}$ and $R_{17}$ being a mono-halo-lower alkoxy or mono-halo-lower alkyl group with a hydroxy group.

The conversion of a compound of formula IX into the corresponding compound of formula I wherein the aliphatically bound halogen atom is replaced by a hydroxy group can be effected using conventional techniques as, for example, hydrolysis or alcoholysis of the corresponding acetate with catalytic amounts of a base. The reaction is expediently performed in the presence of an organic solvent. Suitable solvents for this purpose include alcohols, ketones such as acetone, ethers such as dioxane, dimethylformamide, dimethylsulfoxide, and the like and at temperatures between about room temperature and about the reflux temperature of the reaction mixture.

G. In a further process aspect of the present invention, compounds of formula I wherein $R_4$ signifies a lower alkylsulfinyl or lower alkylsulfonyl group can be prepared by oxidizing the lower alkylthio group of a compound of the formula

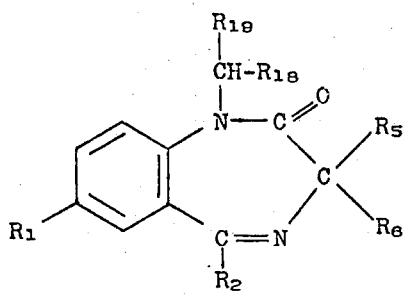

X wherein $R_1$, $R_2$, $R_5$ and $R_6$ are as described above; $R_{18}$ signifies lower alkylthio and $R_{19}$ signifies hydrogen, lower alkyl, hydroxy-lower alkyl, halo-lower alkyl, acyloxy-lower alkyl or carbalkoxy, and where, in the case that $R_5$ signifies hydrogen, the nitrogen atom in the 4-position can carry an oxygen atom.

The oxidation of the lower alkylthio group in the compound of formula X yields a compound of the formula

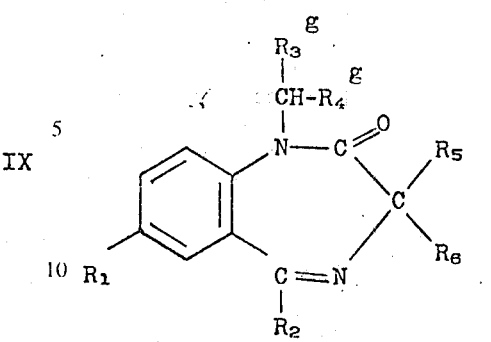

Ih wherein $R_1$, $R_2$, $R_5$ and $R_6$ are as described above, and where, in the case that $R_5$ signifies hydrogen, the nitrogen atom in the 4-position can carry an oxygen atom; $R_3''$ signifies hydrogen, lower alkyl, hydroxy-lower alkyl, halo-lower alkyl, acyloxy-lower alkyl or carbalkoxy; and $R_4''$ signifies lower alkylsulfinyl or lower alkylsulfonyl.

The oxidation of the lower alkylthio group of a compound of formula X can be effected with the aid of an oxidizing agent such as peracid, for example peracetic acid, perbenzoic acid and the like or hydrogen peroxide. The reaction is expediently carried out in the presence of an inert organic solvent such as halogenated hydrocarbon, i.e. carbon tetrachloride, acetic acid, and the like. Suitable temperatures for the purposes of this reaction are in the range of from about $-50°C$ to about $80°C$.

H. In a further process aspect of the present invention, compounds of formula I wherein $R_1$, $R_2$, $R_3$, $R_4$ and $R_6$ are as described above can be prepared by the cyclization of a compound of the formula

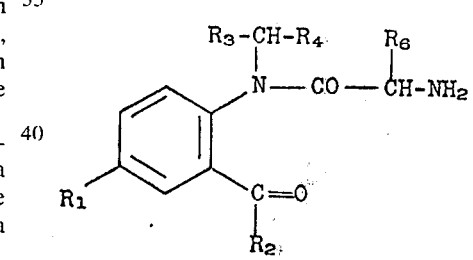

XI wherein $R_1$ through $R_4$ and $R_6$ are as described above.

The cyclization of a compound of formula XI can be effected in alkaline, neutral or acidic medium. Preferably, the reaction is carried out in the presence of an inert organic solvent such as hydrocarbons, chlorinated hydrocarbons, ethers, glacial acetic acid, alcohols, dimethylformamide and the like. Temperature and pressure are not critical factors but it is expedient to work at temperatures in a range of from about $0°$ to about $150°C$.

I. In a further process aspect of the present invention, compounds of formula I wherein the $R_5$ substituent signifies a hydroxy group can be prepared by hydrolyzing a compound of the formula

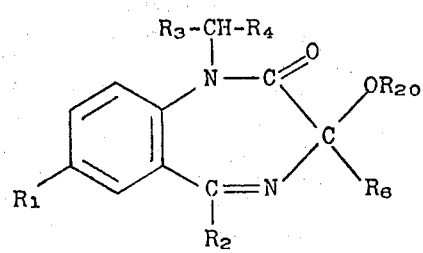

XII wherein $R_1-R_4$ and $R_6$ are as described above and $R_{20}$ signifies an acyl group.

The hydrolysis of the acyl group of a compound of formula XII can be effected following a variety of conventional techniques, for example, by alkaline or acidic hydrolysis or alcoholysis. The acidic hydrolysis is preferably effected by treatment of the starting material with an aqueous solution of a mineral acid such as hydrochloric acid, hydrobromic acid, sulfuric acid and the like or a solution of an organic acid such as toluene sulfonic acid. Temperature and pressure are not critical to this reaction. However, the acid treatment is expediently carried out at room temperature. Further, the reaction is expediently effected in the presence of an aqueous medium which contains an organic solvent which is miscible with water such as dioxane, tetrahydrofuran and the like. The alkaline hydrolysis is preferably effected with aqueous alkali hydroxides such as sodium hydroxide and the like. Where a compound of formula XII bearing a carbalkoxy group as the $R_3$ substituent is used as the starting material, the hydrolysis of the acyl group is expediently effected by alcoholysis for example with sodium ethoxide in ethanol or triethylamine in ethanol.

J. In a further process aspect of the present invention, compounds of formula I wherein $R_5$ and $R_6$ signify hydrogen and the nitrogen atom in the 4-position does not carry an oxygen atom can be prepared by the deoxidation of a compound of formula

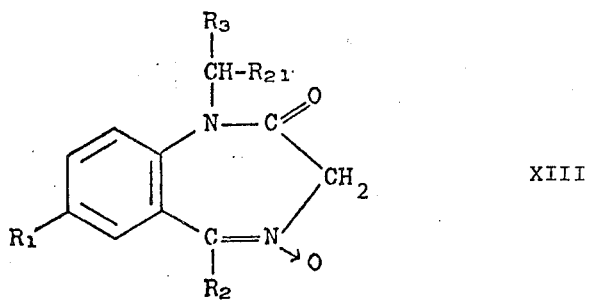

XIII wherein $R_1$, $R_2$ and $R_3$ are as described above and $R_{21}$ signifies lower alkoxy, halo-lower alkoxy, mono-lower alkylamino-lower alkoxy, di-lower alkylamino-lower alkoxy, hydroxy-lower alkoxy, alkoxy-lower alkoxy, or lower alkylthio, $R_{21}$ being other than mono-lower alkylamino-lower alkoxy or di-lower alkylamino-lower alkoxy in case $R_3$ stands for carbalkoxy.

The deoxidation of a compound of formula XIII can be achieved by following a variety of techniques. For example, the deoxidation can be effected by hydrogenation in the presence of Raney Nickel. This reaction is expediently carried out in the presence of an inert organic solvent. Suitable solvents include hydrocarbons, such as benzene, toluene and the like, alcohols, ethers such as dioxane, acetic ester and the like. The reaction is preferably effected at room temperature and normal or elevated pressure. The deoxidation can also be effected by treating a compound of formula XIII with a phosphorus trihalide such as phosphorus trichloride, preferably in the presence of an inert organic solvent such as hydrocarbons, i.e. benzene and the like, or chlorinated hydrocarbons. Temperature and pressure are not critical although the reaction is preferably effected at room temperature. Further, the deoxidation can also be effected with zinc and glacial acetic acid in an organic solvent such as glacial acetic acid, chlorinated hydrocarbons, ethers, alcohols and the like. The reaction is expediently carried out at temperatures between about $-20°$ to about $50°C$. The choice of the deoxidizing agent is largely governed by the functional groups present in molecule in order to avoid unfavorable side reactions as far as possible. Accordingly, when the starting material containing a halo-lower alkyl, halo-lower alkoxy lower alkylthio and/or nitro group in the molecule, one will expediently deoxidize with a phosphorus trihalide while when the starting material contains a hydroxy-lower alkyl and/or hydroxy-lower alkoxy group, Raney Nickel or zinc/glacial acetic acid will advantageously be employed.

K. In a further process aspect of the present invention, compounds of formula I wherein the $R_5$ and $R_6$ substituents are hydrogen are prepared by dehydrating a compound of the formula

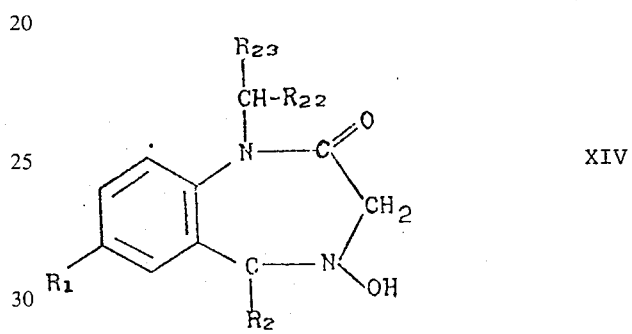

XIV wherein $R_1$ and $R_2$ are as described above; $R_{22}$ signifies lower alkoxy, di-lower alkylamino-lower alkoxy or alkoxy-lower alkoxy; and $R_{23}$ signifies hydrogen, lower alkyl, carbalkoxy, acyloxy-lower alkyl, or di-lower alkylamino-lower alkyl, $R_{22}$ being other than di-lower alkylamino-lower alkoxy in case $R_{23}$ stands for carbalkoxy.

The dehydration of a compound of formula XIV can be effected by treating the formula XIV compound with a carbodiimide such as cyclohexylcarbodiimide. The reaction is expediently carried out in the presence of an inert organic solvent such as hydrocarbons, i.e. benzene, toluene and the like, and ethers, such as dioxane and the like. Suitable temperatures for this reaction are in the range of from about $-20°$ to about $100°C$. With this dehydration reaction the formation of the corresponding isomeric 3,4-dehydro derivatives is frequently observed. These 3,4-dehydro derivatives can, however, be readily isomerized to the desired 4,5-dehydro compounds, for example, by treatment with a base such as alkali alkoxides, i.e. sodium methoxide, triethylamine and the like.

L. In a further process aspect, a compound of the general formula

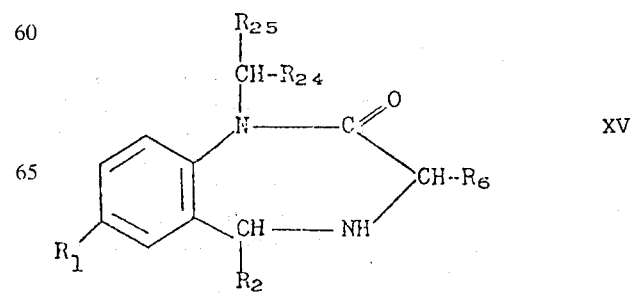

XV wherein $R_1$, $R_2$ and $R_6$ are as described above; $R_{24}$ signifies lower alkoxy, mono-lower alkyl-amino-lower alkoxy, di-lower alkylamino-lower alkoxy, hydroxy-lower alkoxy, or alkoxy-lower alkoxy; and $R_{25}$ signifies hydrogen, lower alkyl, hydroxy-lower alkyl, acyloxy-lower alkyl, carbalkoxy, mono-lower alkylamino-lower alkyl, or di-lower alkylamino-lower alkyl, $R_{24}$ being other than mono-lower alkylamino-lower alkoxy or di-lower alkylamino-lower alkoxy in case $R_{25}$ stands for carbalkoxy, is oxidized or dehydrogenated at the 4,5-bond to yield a compound of the formula

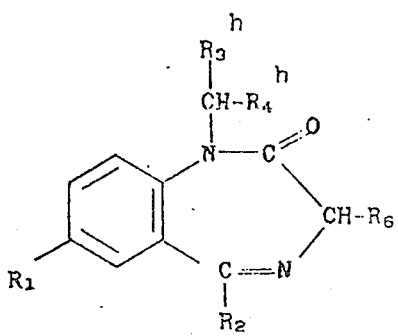

Ii wherein $R_1$, $R_2$ and $R_6$ are as described above; $R_3^h$ signifies hydrogen, lower alkyl, hydroxy-lower alkyl, acyloxy-lower alkyl, carbalkoxy, mono-lower alkylamino-lower alkyl or di-lower alkylamino-lower alkyl; and $R_4^h$ signifies lower alkoxy, mono-lower alkylamino-lower alkoxy, di-lower alkylamino-lower alkoxy, hydroxy-lower alkoxy, or alkoxy-lower alkoxy, $R_4^h$ being other than mono-lower alkylamino-lower alkoxy or di-lower alkylamino-lower alkoxy in case $R_3^h$ stands for carbalkoxy. The oxidation of a compound of formula XV can be effected with bromine, chlorine, azodicarboxylic acid esters such as diethyl ester, halosuccinimides such as bromosuccinimide and haloamides such as chloroacetamide. The reaction is expediently carried out in the presence of an inert organic solvent. Suitable solvents include hydrocarbons, such as benzene, toluene and the like, halogenated hydrocarbons such as carbontetrachloride, and ethers such as dioxane, tetrahydrofuran and the like.

Further, the reaction is preferably effected at a temperature between about $-70°$ and about $100°C$.

M. In a further process aspect of the present invention, compounds of formula I wherein $R_6$ is hydrogen can be prepared by saponifying and decarboxylating a compound of the general formula

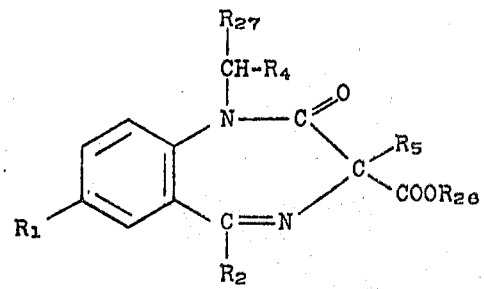

XVI wherein $R_1$, $R_2$, $R_4$ and $R_5$ are as described above; $R_{26}$ signifies lower alkyl; and $R_{27}$ signifies hydrogen, lower alkyl, hydroxy-lower alkyl, halo-lower alkyl, acyloxy-lower alkyl, mono-lower alkylamino-lower alkyl, or di-lower alkylamino-lower alkyl.

Compounds of formula XVI can be saponified to the 3-carboxylic acid salts, for example, by treatment with alkali hydroxides such as sodium hydroxide, potassium hydroxide, and the like, alkaline earth hydroxides such as calcium hydroxide and the like or tertiary organic bases such as triethylamine. The decarboxylation of these 3-carboxylic acid salts occurs slowly on standing, more quickly on heating and spontaneously on acidification.

N. In a further process aspect of the present invention, a compound of formula I wherein $R_5$ signifies hydroxy and $R_6$ signifies carbalkoxy can be prepared by oxidizing a compound of the general formula

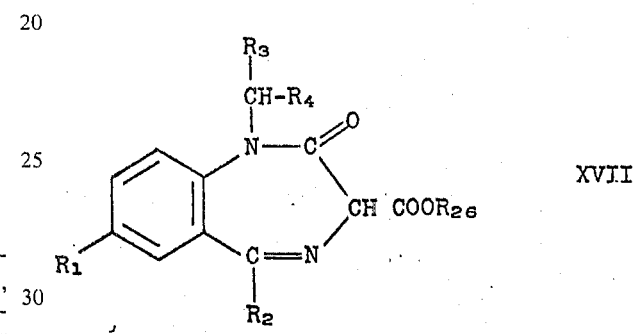

XVII wherein $R_1$–$R_4$ and $R_{26}$ are as described above.

Compounds of formula XVII can be oxidized to the corresponding 3-hydroxy-3-carbalkoxy derivatives with air or oxygen in the presence of a base. The oxidation is expediently effected in the presence of an inert organic solvent such as ethers, i.e. tetrahydrofuran, dioxane and the like, alcohols, dimethylformamide and the like. Suitable bases for this purpose include alkali alkoxides, such as sodium methoxide, alkali hydrides, alkali amides and alkali hydroxides such as sodium hydroxide. When using alkali hydroxides however a saponification of the carbalkoxy group present in the 3-position or an exchange of a halo atom for a hydroxy group in a halo-lower alkyl and/or halo-lower alkoxy substituted compound can simultaneously occur. In oxidizing starting materials bearing these substituents the oxidation should not be effected using an alkali hydroxide. For the same reason, the use of an alkali hydroxide should be avoided in the presence of a carbalkoxy group substituent in the 1-position.

O. In a further process aspect of the present invention, a compound of the general formula

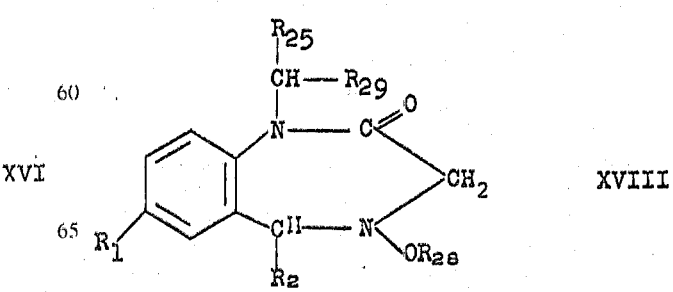

XVIII wherein $R_1$, $R_2$ and $R_{25}$ are as described above; $R_{28}$ signifies acyl and $R_{29}$ signifies lower alkoxy, mono-lower alkylamino-lower alkoxy, di-lower alkylamino lower alkoxy, hydroxy-lower alkoxy or alkoxy-lower alkoxy, $R_{29}$ being other than mono-lower aklylamino-lower alkoxy or di-lower alkylamino-lower alkoxy in case $R_{25}$ stands for carbalkoxy, is treated with a base to yield the corresponding 4,5-dehydro compound, i.e. a compound of the formula

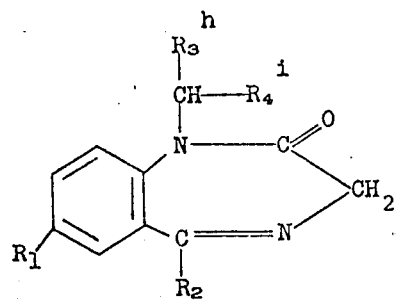

Ij wherein $R_1$, $R_2$ and $R_3{}^h$ are as described above; and $R_4{}^i$ signifies lower alkoxy, mono-lower alkylamino-lower alkoxy, di-lower alkylamino-lower alkoxy, hydroxy-lower alkoxy or alkoxy-lower alkoxy, $R_4{}^i$ being other than mono-lower alkylamin-lower alkoxy or di-lower alkylamino-lower alkoxy in case $R_3{}^h$ stands for carbalkoxy.

The acid cleavage from a compound of Formula XVIII to yield a compound of formula Ij can be achieved with a strong base. Suitable bases include alkali hydrides such as sodium hydride, triethylamine, alkali amides such as sodium amide, alkali alkoxides such as sodium methoxide and the like in an anhydrous medium. In so doing, the reaction is expediently effected in the presence of an inert organic solvent such as ethers, alcohols, i.e. ethanol, hydrocarbons, i.e. benzene, toluene and the like, dimethylformamide and the like and at temperatures between about $-40°$ to about $120°C$. The acyl group present as the $R_{28}$ substituent can be a lower alkanoyl such as acetyl, aroyl such as benzoyl, tosyl or mesyl. In the acid cleavage of a compound of Formula XVIII there may be formed as an intermediate product a compound of the formula

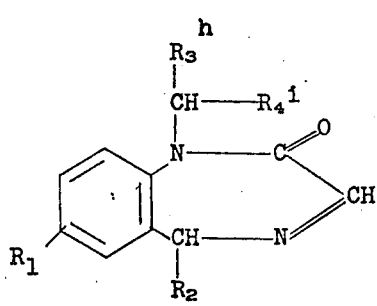

XIX wherein $R_1$, $R_2$, $R_3{}^h$, and $R_4{}^i$ as described above.

A compound of Formula XIX can be rearranged to the corresponding, 4,5-dehydro compound by treatment with a base such as alkali alcoholates, i.e. sodium methoxide; alkali hydrides, i.e. sodium hydride, triethylamine and the like. The reaction is expediently effected in an inert organic solvent such as hydrocarbons, ethers, alcohols and the like, and at temperatures between about $-40°$ to about $120°C$.

P. In a further process aspect of the present invention, a compound of the general formula

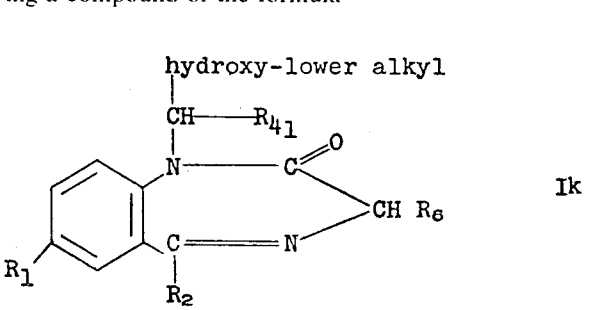

XX wherein $R_1$, $R_2$ and $R_6$ are as described above; $R_{30}$ signifies a mesyl or tosyl group; $R_{31}$ signifies hydrogen, lower alkyl, hydroxy-lower alkyl, acyloxy-lower alkyl, carbalkoxy or di-lower alkylamino-lower alkyl; and $R_{32}$ signifies lower alkoxy, di-lower alkylamino-lower alkoxy, hydroxy-lower alkoxy, alkoxy-lower alkoxy, lower alkylthio, lower alkylsulfinyl, or lower alkylsulfonyl $R_{32}$ being other than di-lower alkylamino-lower alkoxy in case $R_{32}$ stands for carbalkoxy is converted into the corresponding 4,5-dehydro compound by treatment with a strong base.

The splitting off a mesyl or tosyl group from a compound of Formula XX can be achieved with a strong base such as alkali hydrides, i.e. sodium hydride, alkali alkoxides, i.e. sodium methoxide, triethylamine and alkali amides such as sodium amide and the like in an anhydrous medium. In so doing the reaction is expediently carried out in the presence of an inert organic solvent such as ethers, alcohols, such as ethanol, hydrocarbons such a benzene, toluene and the like, dimethylformamide and the like using temperatures between about 0° and about 120°C. Again with this reaction, as described above, an isomeric intermediate product of Formula XIX or a 3-carbalkoxy derivative thereof can occur. This intermediate product can be converted to the desired end product by treatment with a base.

Q. In a further process aspect of the present invention, a compound of formula I wherein the $R_3$ group is an acyloxy-lower alkyl group can be prepared by treating a compound of the formula Ik wherein $R_1$, $R_2$, and $R_6$ are as described above and $R_{41}$ signifies lower alkoxy, halo-lower alkoxy, di-lower alkylamino-lower alkoxy, alkoxy-lower alkoxy, lower alkylthio, lower alkylsulfinyl, or lower alkylsulfonyl, or the corresponding 4-oxide thereof in case $R_6$ represents hydrogen with an acylating agent.

The esterification of a compound of formula Ik to obtain a compound of formula I wherein the $R_3$ substituent is an acyloxy-lower alkyl group can be effected utilizing any suitable acylating agent. Suitable acylating agents for this purpose include acid anhydrides such as acetic anhydride and acid chlorides such as acetylchloride, benzoylchloride and the like. The reaction conditions are not critical and are preferably selected in accordance with the esterification agent being employed. Room temperature or temperatures above or below can be employed depending upon the reagent chosen. The reaction is preferably carried out in the presence of an organic solvent. Suitable solvents include hydrocarbons such as benzene, toluene and the like, halogenated hydrocarbons such as methylene chloride, dimethylformamide, pyridine and the like.

R. In a further process aspect of the present invention, compounds of formula I wherein the $R_3$ substituent is an acyloxy-lower alkyl group can also be prepared by converting the aliphatically bound halogen atom of a compound of the formula

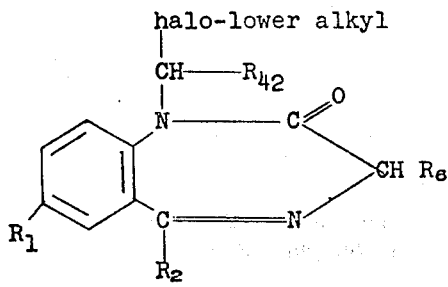

Il wherein $R_1$, $R_2$ and $R_6$ are as described above; and $R_{42}$ signifies lower alkoxy, di-lower alkylamino-lower alkoxy, alkoxy-lower alkoxy, lower alkylthio, lower alkylsulfinyl, or lower alkylsulfonyl or the corresponding 4-oxide thereof in case $R_6$ represents hydrogen
to an acyloxy group.

The introduction of an acyloxy group into a compound of formula II above is expediently effected using a silver, sodium or potassium salt of the corresponding acid, i.e. potassium acetate and the like. The reaction is expediently carried out in the presence of an organic solvent. Suitable solvents include hydrocarbons such as benzene, toluene and the like, dimethylformamide, and ketones such as acetone, methylethyl ketone and the like. Depending upon the reagent, temperatures between room temperature and the reflux temperature of the reaction mixture can be employed.

Compounds of formula I' can be prepared by reducing corresponding 7-nitro-benzodiazepinones of formula I. The reduction can advantageously be effected by catalytic hydrogenation preferably in the presence of Raney nickel. The hydrogenation is suitably performed in an inert solvent, e.g. a lower alkanol, such as methanol, ethanol, and ether, such as dioxane, and the like. The reaction temperature is not critical. It is advantageously chosen between 10°C and the reflux temperature of the reaction mixture, conveniently around room temperature.

The starting materials employed in the various process aspects described above can be prepared by reference to the pertinent alternate process aspects. In particular, the 4-desoxy compounds of formulae VI, VII, IX, X, XVI and XVII which do not carry a hydroxy group in the 3-position can be obtained by employing the process varient H described hereinbefore. The corresponding 4-oxides of formulae VI, IX, X, XVI, described above and of formula XXI described below, insofar as they are not accessible by employment of the process varient described hereinbefore under A can be obtained by oxidation of the corresponding 4-desoxy compound, for example by treatment with peracids such as peracetic acid in an organic solvent such as acetic acid, chlorinated hydrocarbons such as methylene chloride and the like.

The 3-hydroxy compounds of formulae VI, IX, X and XVI can, for example, be manufactured by treating a compound of the general formula

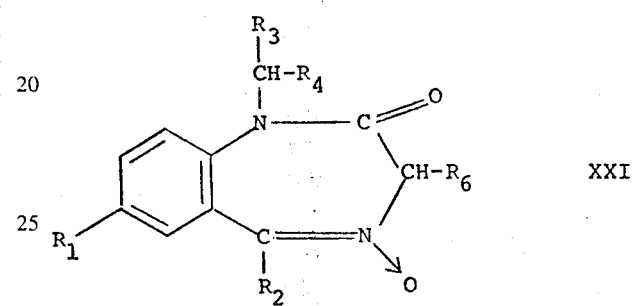

XXI wherein $R_1$–$R_4$ and $R_6$ are as described above
with an anhydride, sulphide or halide of an aliphatic, aromatic or araliphatic carboxylic acid. The reaction brings about a splitting off of the oxygen atom in the 4-position with simultaneous acyloxylation of the carbon atom in the 3-position. The reaction is expediently carried out in an inert organic solvent. Suitable solvents include hydrocarbons such as benzene, toluene and the like, halogenated hydrocarbons such as carbon tetrachloride and the like and dimethylformamide. When using an acid anhydride or a diacyl sulphide as the acylating agent, these acid anhydrides or diacyl sulphides can also serve directly as the reaction medium. Subsequent hydrolysis of the resulting 3-acyloxy derivatives yield the 3-hydroxy derivatives. The hydrolysis can be effected following the procedures set forth in process aspect I.

The 3-hydroxy compounds of formula VI can also be prepared from corresponding compounds unsubstituted in the 3-position by treatment with a halogenating agent which displays a

$-N-X$ group (wherein X signifies halogen). The corresponding 3-halo compound obtained can then be converted, for example, by reaction with an acetate or an alcohol, into the 3-acetoxy or 3-alkoxy compound. The resulting 3-acetoxy or 3-alkoxy compound can then be converted into the desired 3-hydroxy compound by hydrolysis, for example, by treatment with a base in a solvent (e.g., methanolic NaOH). Suitable halogenating agents for this purpose include N-chlorosuccinimide, N-bromosuccinimide, N-halo-lower alkanoyl amides and the like. The halogenation is expediently effected in the presence of an inert organic solvent. Suitable solvents include hydrocarbons such as benzene, toluene and the like, and chlorinated hydrocarbons such as carbon tetrachloride and the like. Temperature and pressure are not critical for this process and, therefore, the reaction can be conducted at room temperature or elevated temperatures and at atmospheric pressure. Further, the reaction is preferably effected in the presence of a catalyst which results in the formation of a radical in the reaction mixture as, for example, azo-bis-(lower alkyl nitriles) such as azodiisobutyronitrile and the like.

Compounds of formula VII are all accessible utilizing process aspect C described above. Compounds of formula VIII can be obtained by analogy to process aspect C described above, employing a suitable amine with a protecting group.

Compounds of formula XI can be manufactured following conventional techniques. For example, the formula XI compounds can be prepared by reacting a carbobenzoxyglycylamido-benzophenone of the general formula

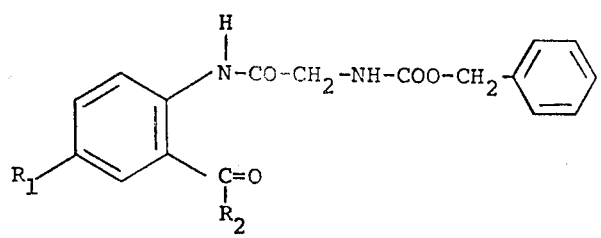

XXII or a 2'-benzoyl-phthalimido-acetanilide of the general formula

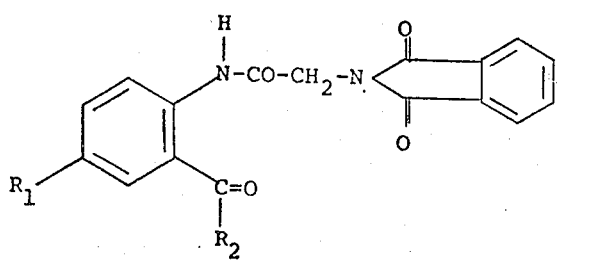

XXIII or a tert.-butoxy-glycylamidobenzophenone of the general formula

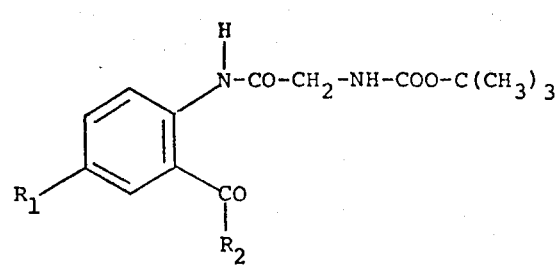

XXIV wherein in formulae XXII, XXIII and XXIV, $R_1$ and $R_2$ are as described above
with a compound of formula III above and subsequently splitting off the carbobenzoxy residue, or the phthalimide residue or the tert.-butoxycarbonyl residue. If necessary, an aliphatically bound halogen atom can be exchanged for a hydroxy group or a monoalkylamino or dialkylamino group or an alkylthio group can be oxidized to an alkylsulphinyl or alkylsulphonyl group before the splitting off. The reaction of a compound of formula XXII, XXIII or XXIV with a compound of formula III can be effected in the manner stated above for the reaction of a compound of formula II with a compound of formula III. The splitting off of the carbobenzoxy residue can be carried out by catalytic hydrogenation or by means of a hydrohalic acid in the presence of acetic acid. The catalytic hydrogenation can be effected in, for example, glacial acetic/HCl or ethanol/HCl. The splitting off by means of a hydrohalic acid in glacial acetic can be effected in the presence of an inert organic solvent such chlorinated hydrocarbons (e.g., methylene chloride) and the like and at temperatures between —20° and room temperature. The splitting off of the phthalimide residue is expediently undertaken by hydrazinolysis in an inert organic solvent such as alcohols, ethers such as dioxane, dimethylformamide and the like and at temperatures between room temperature and 150°C. The splitting off of the tert.-butoxycarbonyl residue can be carried out with trifluoroacetic acid and in an organic solvent such as hydrocarbons, chlorinated hydrocarbons, glacial acetic or trifluoroacetic acid and expediently at room temperature.

Compounds of formula XI thus obtained can be cyclized to the corresponding benzodiazepine derivatives of formula I without isolation.

Furthermore, compounds of formula XI can be obtained by reacting a compound of the general formula

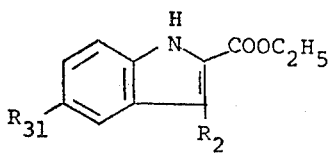

XXV wherein $R_2$ is as described above and $R_{31}$ signifies halogen with a compound of the general formula

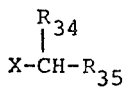

XXVI wherein X is as described above; $R_{34}$ signifies hydrogen, lower alkyl or halo-lower alkyl; and $R_{35}$ signifies lower alkoxy, alkoxy-lower alkoxy or halo-lower alkoxy.

The halo-lower alkoxy group in the resulting compound is then converted into a mono- or di-lower alkylamino-lower alkoxy group or the halo-lower alkyl group converted into a mono- or di-lower alkylamino-lower alkyl group, to yield a compound of the formula

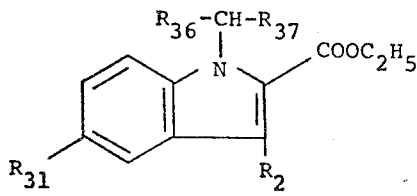

XXVII wherein $R_2$ and $R_{31}$ are as described above; $R_{36}$ signifies hydrogen, lower alkyl, mono- or di-lower alkylamino-lower alkyl; and $R_{37}$ signifies lower alkoxy, alkoxy-lower alkoxy, or mono- or di-lower alkylamino-lower alkoxy.

The resulting compound of formula XXVII is then reduced to yield a compound of the formula

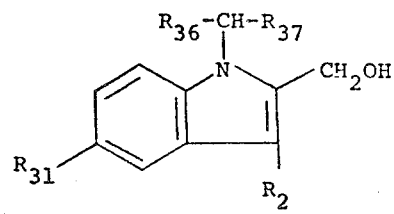

XXVIII wherein $R_2$, $R_{31}$, $R_{36}$ and $R_{37}$ are as described above. The resulting compound of formula XXVIII is then oxidized to the corresponding 2-carboxaldehyde. The 2-carboxaldehyde is then oximized to yield a compound of the formula

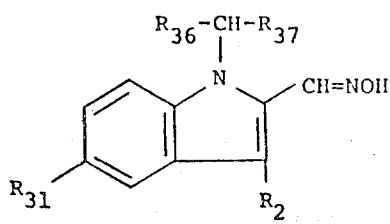

XXIX wherein $R_2$, $R_{31}$, $R_{36}$ and $R_{37}$ are as described above. The resulting compound of formula XXIX is then reduced to yield a compound of the formula

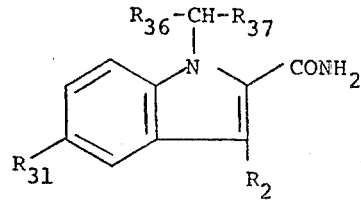

XXX wherein $R_2$, $R_{31}$, $R_{36}$ and $R_{37}$ are as described above. The resulting compound of the formula XXX can then be oxidized to the desired compound of formula XI.

However, a compound of formula XXVII can also be converted into an amide of the general formula

XXXI wherein $R_2$, $R_{31}$, $R_{36}$ and $R_{37}$ are as described above by conventional techniques and the compound then reduced to the corresponding compound of formula XXX.

The reaction of a compound of formula XXV with a compound of formula XXVI can be effected in the manner stated above for the reaction of a compound of formula II with a compound of formula III. The conversion of a halo-lower alkoxy or halo-lower alkyl group into a mono- or di-lower alkylamino-lower alkoxy or mono- or di-lower alkylamino-lower alkyl group can be effected in the manner stated for a compound of formula VI. The reduction of a compound of the formulae XXVII, XXIX and XXX is expediently effected with a reducing agent such as lithium aluminum hydride and in an inert organic solvent such as ethers (e.g. tetrahydrofuran and the like). The oxidation of a compound of formula XXVIII is expediently effected with an oxidizing agent such as manganese dioxide and in an inert organic solvent such as hydrocarbons (e.g. benzene, toluene), chlorinated hydrocarbons such as methylene chloride and at temperatures between about room temperature and about the reflux temperature of the reaction mixture. The oximization of the 2-carboxaldehyde obtained is achieved with hydroxylamine. This reaction is expediently effected in a solvent such as water, alcohols, ethers, triethylamine, pyridine and the like and at temperatures between about room temperature and about the reflux temperature of the reaction mixture. The oxidation of a compound of formula XXX can be effected with an oxidizing agent such as chromium trioxide in glacial acetic acid. Compounds of formula XXX are expediently oxidized and cyclized without isolation of a compound of formula XI.

Compounds of formula XII can be manufactured by treatment of a corresponding 4-oxide with an acid anhydride, sulphide or halide in the manner described for the reaction of a compound of formula XXI.

Compounds of formula XIII can be manufactured by employing process aspects A, C, D, E and F described above.

Compounds of formula XIV can be obtained by reduction of the corresponding 4-oxide of the general formula

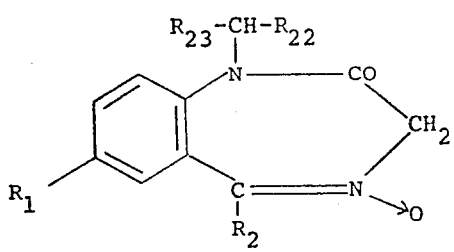

XXXII wherein $R_1$, $R_2$, $R_{22}$ and $R_{23}$ are as described above; in the presence of platinum oxide. This reaction is expediently effected in the presence of an organic solvent such as glacial acetic, alcohols and at a temperature between about 0° and 50°C., preferably at room temperature.

Compounds of formula XIV can also be prepared by the reaction of a compound of the general formula

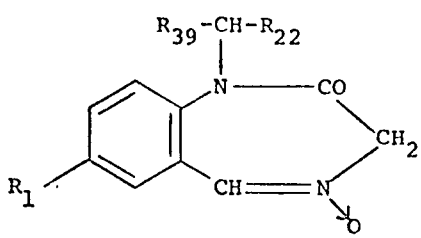

XXXIII wherein $R_1$ and $R_{22}$ are as described above and $R_{39}$ signifies hydrogen, lower alkyl, or di-lower alkylamino-lower alkyl, with a compound of the general formula

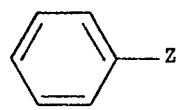—Z

XXXIV wherein Z signifies Li, MgI or MgBr.

The reaction is expediently effected in the presence of an inert organic solvent such as ethers, hydrocarbons, and at temperatures between about −60°C. and the relux temperature of the reaction mixture. Compounds of formula XXXIII can in turn be manufactured by introduction of the substituent into the 1-position of a compound which is unsubstituted in the 1-position in accordance with process aspects A, C, D and E.

Compounds of formula XV can be manufactured by reaction of a corresponding 1-unsubstituted compound with a compound of formula III in accordance with process A and possible subsequent reaction in accordance with the processes described in aspects C – E.

Compounds of formula XVIII can be manufactured by acylation of a corresponding 4-hydroxy-substituted compound of formula XIV or an analogue thereof which is obtained in analogy to the manufacture of compounds of formula XIV. Suitable acylating agents are, for example, acid anhydrides such as acetic acid anhydride, acid halides and the like. One expediently works in the presence of a base as acid-acceptor, such as pyridine and the like, and in an organic solvent such as hydrocarbons, chlorinated hydrocarbons, ethers and the like at temperatures between about −50° and 100°C. In the case where a monoalkylamino group is present as the substituent in the 1-position, this group is preferably protected (e.g. by a carbobenzoxy group or an equivalent protecting group) before the acylation. The carbobenzoxy group can again be removed in the manner described herein.

Compounds of formula XX can be obtained by acylation (e.g. with a tosyl or mesyl halide) of a corresponding 4,5-dihydro compound of formula XV or an analogue thereof which is obtained in analogy to the manufacture of compounds of formula XV. One expediently works in an inert organic solvent such as hydrocarbons (e.g. benzene), chlorinated hydrocarbons and the like and in the presence of an acid-acceptor such as pyridine and the like and at temperatures between 0°C. and reflux temperature of the reaction mixture.

Compounds of formula XXI can be manufactured from corresponding compounds of formula XVIII or XX in the manner described herein. Moreover, compounds of formula XXI can be manufactured by introduction of a substituent into a 1-unsubstituted compound in accordance with the methods A, C, D, E and F described herein. However, with this reaction an isomerisation to a 4,5-dehydro compound can simultaneously be effected. It is to be pointed out that the respective starting materials do not necessarily have to be employed in isolated state, but can also be further reacted without isolation from the reaction mixture in which they have been manufactured.

Compounds of formula I and I' above which are basic in character, form acid addition salts with inorganic or organic acids. Suitable acids for the purpose include hydrochloric acid, phosphoric acid, hydrobromic acid, citric acid, sulphuric acid, acetic acid, formic acid, succinic acid, maleic acid, p-toluenesulphonic acid and the like.

Compounds of formula I and I' above, as well as their pharmaceutically acceptable salts, are useful as anticonvulsants, muscle relaxants and sedatives. Their useful anticonvulsant activity is demonstrated in warm blooded animals utilizing the standard pentamethylenetetrazole test. In this test, following the method of Orloff (Proc. Soc. Exptl. Biol. Med., 70, 254–257, 1949), 7-nitro-5-phenyl-1-methoxymethyl-1,3-dihydro-2H-1,4-benzodiazepin-2-one, which displays an $LD_{50}$ of 600–1200 mg/kg (p.o.), shows an APR 2.0 of 0.5 mg/kg (p.o.) [by APR 2.0 is understood that dose in mg/kg of an anticonvulsant which brings about double the pentetrazole consumption in comparison to the untreated control group], 7-nitro-5-phenyl-1-ethoxymethyl-1,3-dihydro-2H-1,4-benzodiazepin-2-one ($LD_{50}$ 1200-2500 mg/kg p.o.) shows an APR 2.0 of 0.2 mg/kg (p.o.) and 7-nitro-5-phenyl-1-[(2-chloroethoxy)-methyl]-1,3-dihydro-2H-1,4-benzodiazepin-2-one ($LD_{50}$ >5000 mg/kg p.o.) shows am APR 2.0 of 1.8 mg/kg (p.o.). In contrast thereto, phenobarbital, a commonly used anticonvulsant, shows an APR 2.0 of 30 mg/kg. The muscle relaxant activity is demonstrated in warm blooded animals utilizing the standard rotating rod test. For example, the above-mentioned 7-nitro-5-phenyl-1-methoxymethyl-1,3-dihydro-2H-1,4-benzodiazepin-2-one shows an $HD_{50}$ of 2 mg/kg (p.o.), 7-nitro-5-phenyl-1-ethoxymethyl-1,3-dihydro-2H-1,4-benzodiazepin-2-one shows an $HD_{50}$ of 5 mg/kg (p.o.) and 7-nitro-5-phenyl-1-[(2-chloroethoxymethyl)]-1,3-dihydro-2H-1,4-benzodiazepin-2-one shows an $HD_{50}$ of 0.5 mg/kg (p.o.).

Compounds of formula I and I', as well as their pharmaceutically acceptable salts can accordingly be used as medicaments; for example, in the form of pharmaceutical preparations which contain them or their salts in admixture with a pharmaceutical organic or inorganic inert carrier material which is suitable for enteral or parenteral application such as, for example, water, gelatin, lactose, starches, magnesium stearate, talc, vegetable oils, gums, polyalkyleneglycols, Vaseline, etc. The pharmaceutical preparations can be submitted in solid form (e.g. as tablets, dragees, suppositories, capsules), or in liquid form (e.g. as solutions, suspensions or emulsions). They may be sterilized and/or contain additives such as preserving, stabilizing, wetting or emulsifying agents, salts for varying the osmotic pressure or buffers. They can also contain other therapeutically valuable substances. The dosage follows individual requirements, but a disage of 0.1 mg/kg-10 mg/kg/day is preferred.

As is evident from the above the invention in its broadest aspect encompasses compounds of the formula

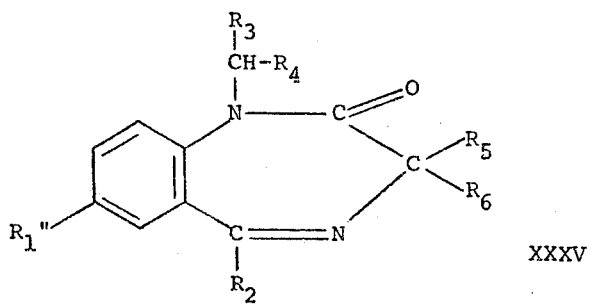

XXXV wherein $R_1''$ signifies halogen, nitro or amino; $R_2$ signifies phenyl, mono-halo phenyl or pyridyl; $R_3$ signifies hydrogen, lower alkyl, hydroxy lower alkyl, halo lower alkyl, carbalkoxy, mono-lower alkylamino-lower alkyl,, di-lower alkylamino-lower alkyl or acyloxy-lower lower alkyl; $R_4$ signifies lower alkoxy, halo-lower alkoxy, amino-lower alkoxy, mono-lower alkylamino-lower alkoxy, di-lower alkylamino-lower alkoxy, hydroxy-lower alkoxy, alkoxy-lower alkoxy, lower alkylthio, lower alkylsulfinyl or lower alkylsulfonyl; $R_4$ being other than mono-lower alkylamino-lower alkoxy or di-lower alkylamino-lower alkoxy in case $R_3$ stands for carbalkoxy; $R_5$ signifies hydrogen or hydroxy; $R_6$ signifies hydrogen or carbalkoxy; and where, in the case that $R_5$ and $R_6$ signifies hydrogen, the nitrogen atom in the 4-position can carry an oxygen atom as well as the pharmaceutically acceptable salts thereof.

The following Examples further illustrate the invention.

EXAMPLE 1

8.1 g (0.15 mol) of sodium methylate are added with stirring to a solution of 28 g (0.1 mol) of 1,3-dihydro-7-nitro-5-phenyl-2H-1,4-benzodiazepin-2-one in 150 ml of dimethylformamide cooled to −15°. After the mixture has been stirred at −15° to −10° for 10 minutes, it is cooled to −50° and 12 ml (0.16 mol) of chloromethyl methyl ether are added dropwise at −50° to −40°. After the addition, the temperature is allowed to rise to −20° within 15 minutes. The dark-brown reaction mixture is poured onto 1 liter of water and the flocculated material is separated off. This is taken up in methylene chloride, the methylene chloride solution washed with water, dried over sodium sulphate and evaporated. The residue is crystallized from ehter and recrystallized from benzene-alcohol, to yield 1,3-dihydro-1-(methoxymethyl)-7-nitro-5-phenyl-2H01,4-benzodiazepin-2-one, m.p. 139°–141°.

EXAMPLE 2

A solution of 13.5 g of 7-chloro-1,3-dihydro-5-phenyl-2H-1,4-benzodiazepin-2-one in 150 ml of dimethylformamide is cooled to −10° and treated with 4 g of sodium methylate. After it has been stirred for 15 minutes at −10° to 0° under a nitrogen atmosphere, it is cooled to −40° and 6 ml of chloromethyl methyl ether are added dropwise. After the addition, the temperature is allowed to rise to 0° within 30 minutes. The reaction mixture is poured onto 1 liter of water and the resin which has separated out separated off. This is taken up in methylene chloride, the solution washed with water, dried over sodium sulphate and evaporated. The residue is chromatographed on 300 g of silica gel with the solvent system methylene chloride:ethyl acetate 9:1 to yield chromatographically pure 7-chloro-1,3-dihydro-1-(methoxymethyl)-5-phenyl-2H-1,4-benzodiazepin-2one.

EXAMPLE 3

In accordance with the manner described in Example 2, from 7.5 g of 7-chloro-5-(o-chlorophenyl)-1,3-dihydro-2H-1,4-benzodiazepin-2-one, 2 g of sodium methylate and 3.1 g of chloromethyl methyl ether there are obtained 8.6 g of crude product. Crystallization from ether and recrystallization from methanol yields pure 7-chloro-5(o-chlorophenyl)-1,3-dihydro-1-(methoxymethyl)-2H-1,4-benzodiazepin-2-one, m.p. 139°–140°.

EXAMPLE 4

In accordance with the manner described in Example 2, from 7.9 g of 5-(o-chlorophenyl)-1,3-dihydro-7-nitro-2H-1,4-benzodiazepin-2-one with 2 g of sodium methylate and 3.1 g of chloromethyl methyl ether in 50 ml of dimethylformamide there are obtained 9.5 g of crude product. This is chromatographed on 200 g of silica gel with 20% ethyl acetate in methylene chloride. The uniform fractions are crystallized from ether and recrystallized from methanol yielding 5-(o-chlorophenyl)-1,3-dihydro-1-(methoxymethyl)-7-nitro-2H-1,4-benzodiazepin-2-one, m.p. 136°–137°.

EXAMPLE 5

The reaction of 7.2 g of 7-chloro-5-(o-fluorophenyl)-1,3-dihydro-2H-1,4-benzodiazepin-2-one with 2 g of sodium methylate and 3.1 g of chloromethyl methyl ether in 50 ml of dimethylformamide gives, after the usual working up, 7.5 g of crude product. From this, by chromatography on 200 g of silica gel with 20% ethyl acetate in methylene chloride, there can be islated 7-chloro-1,3-dihydro-5-(o-fluorophenyl)-1-methoxymethyl -2H-1,4-benzodiazepin-2-one which, crystallized from ether and recrystallized from methanol, melts at 113°–114°C.

EXAMPLE 6

4 g of sodium methylate are added to a solution of 14 g of 1,3-dihydro-7-nitro-5-phenyl-2H-1,4-benzodiazepin-2-one in 150 ml of dimethylformamide, cooled to −20°. After the mixture has been stirred at −10° for 10 minutes, it is cooled to −50° and 7 g of chloromethylethyl ether are added dropwise within 5 minutes. After the addition, the temperature is allowed to rise to −20° within 30 minutes. The reaction mixture is stirred into 1 liter of water, the precipitated resin is separated off, dissolved in methylene chloride and the solution washed with bicarbonate solution and water, dried over sodium sulphate and evaporated. The residue (17g) is chromatographed on 300 g of silica gel with 10% ethyl acetate in methylene chloride.

The uniform fractions, crystallized from ether, give 1-(ethoxymethyl)-1,3-dihydro-7-nitro-5-phenyl-2H-1,4-benzodiazepin-2-one, m.p. 105°–107°, after recrystallization from alcohol.

EXAMPLE 7

A solution of 13.5 g of 7-chloro-1,3-dihydro-5-phenyl-2H-1,4-benzodiazepin-2-one in 150 ml of dimethylformamide, cooled to −10°, is treated with 5.4 g of sodium methylate and stirred at −10° to 0° for 10 minutes. It is thereupon cooled to −40° and 9.5 g of 1-chloroethyl methyl ether are added dropwise within 5 minutes. After the addition, the temperature is allowed to rise to 0° within 40 minutes. The usual working up yields 15.5 g of crude product which is chromatographed on 300 g of silica gel with 10% ethyl acetate in methylene chloride. The uniform fractions crystallize from ether/hexane. Recrystallization from methylene chloride-hexane gives 7-chloro-1,3-dihydro-1-(1-methoxyethyl)-5-phenyl-2H-1,4-benzodiazepin-2-one, m.p. 131°–132°.

EXAMPLE 8

A solution of 14 g of 1,3-dihydro-7-nitro-5-phenyl-2H-1,4-benzodiazepin-2-one in 100 ml of dimethylformamide is cooled to −20° and treated with 4 g of sodium methylate. After 10 minutes stirring at −10°, it is cooled to −50° and 7 g of 1-chloroethyl methyl ether are added dropwise within 5 minutes. The temperature is raised to −20° within 30 minutes and the reaction mixture worked up as usual. The 1,3-dihydro-1-(1-methoxyethyl)-7-nitro-5-phenyl-2H-1,4-benzodiazepin-2-one obtained crystallizes from ether and melts at 189°–190°C after recrystallization twice from methanol.

EXAMPLE 9

In accordance with the manner described in Example 8, the alkylation of 28 g of 1,3-dihydro-7-nitro-5-phenyl-2H-1,4-benzodiazepin-2-one in 200 ml of dimethylformamide with 8 g of sodium methylate and 16 g of 1-chloroethyl ethyl ether yields 13.5 g of product of m.p. 170°–173°. After recrystallization from alcohol, the 1-(1-ethoxyethyl)-1,3-dihydro-7-nitro-5-phenyl 2H-1,4-benzodiazepin-2-one melts at 172°–174°.

EXAMPLE 10

In analogous manner to that in Example 8, by reaction of 28.1 g of 1,3-dihydro-7-nitro-5-phenyl-2H-1,4-benzodiazepin-2-one in 200 ml of dimethylformamide with 8 g of sodium methoxide and 16.2 g of chloromethyl propyl ether there is obtained, after chromatography of the crude product on 500 g of silica gel with 5% ethyl acetone in methylene chloride, 1,3-dihydro-7-nitro-5-phenyl-1-(propoxymethyl)-2H-1,4-benzodiazepin-2-one which melts at 73°–76° after recrystallization from alcohol.

EXAMPLE 11

The alkylation of 28.1 g of 1,3-dihydro-7-nitro-5-phenyl-2H-1,4-benzodiazepin-2-one dissolved in 200 ml of dimethylformamide with 8 g of sodium methoxide and 22.6 g of chloromethyl hexyl ether yields, after chromatography on 600 g of silica gel with 10% ethyl acetate in methylene chloride, 1,3-dihydro-1-(hexyloxymethyl)-7-nitro-5-phenyl-2H-1,4-benzodiazepin-2-one which crystallized from ether, melts at 108°–109°.

EXAMPLE 12

By reaction of 28.1 g of 1,3-dihydro-7-nitro-5-phenyl-2H-1,4-benzodiazepin-2-one with 8 g of sodium methoxide and 18.6 g of chloromethyl (2methoxy) ethyl ether, in accordance with the procedures in Example 8, 1,3-dihydro-1[(2-methoxyethoxy)-methyl]-7-nitro-5-phenyl-2H-1,4-benzodiazepine-2-one is obtained by crystallization from methanol. A product of melting point 120°–121° is obtained after recrystallization from methanol.

EXAMPLE 13

A solution of 28.1 g of 1,3-dihydro-7-nitro-5-phenyl-2H-1,4-benzodiazepin-2-one in 200 ml of dimethylformide is cooled to −10° ad treated with 8 g of sodium methoxide. After it has been stirred at −20° for 10 minutes, 20.7 g of methyl 2-chloro-2-methoxy-acetate are added dropwise at −40°. The temperature is allowed to rise to −10° within 30 minutes and the reaction mixture is poured with stirring onto 500 ml of water. The flocculated product is filtered off by suction, washed with water and taken up in methylene chloride. The methylene chloride solution is dried over sodium sulphate, filtered and evaporated. Crystallization of the residue from methanol yields methyl 2,3-dihydro-α-methoxy-7-nitro-2-oxo-phenyl-1H-1,4-benzodiazepine-1-acetate which melts at 157°–159° after recrystallization from methanol.

EXAMPLE 14

In analogous manner to that in Example 13, from 27.1 g of 7-chloro-1,3-dihydro-5-phenyl-2H-1,4-benzodiazepin-2-one in 400 ml of dimethylformamide, 8 g of sodium methoxide and 20.7 g of methyl 2-chloro-2-methoxy-acetate there is obtained methyl 7-chloro-2,3-dihydro-α-methoxy-2-oxo-5-phenyl-1H-1,4-benzodiazepine-1-acetate which melts at 195°–196° after recrystallization from methanol/methylene chloride.

EXAMPLE 15

8 g of sodium methoxide are added to a solution of 28.1 g of 1,3-dihydro-7-nitro-5-phenyl-2H-1,4-benzodiazepin-2-one in 150 ml of dimethylformamide, cooled to −20°. The mixture is stirred at this temperature for 5 minutes and then cooled to −50°. 19.3 g of chloromethyl 2-chloroethyl ether are added dropwise at 50° to −40°. After the addition, the temperature is allowed to rise to −20° within 15 minutes. The mixture is poured with stirring onto 500 ml of water, the precipitated material is separated off and taken up in methylene chloride. After drying over sodium sulphate, the methylene chloride solution is evaporated and the residue crystallized from alcohol. The crystals filtered off by suction are washed with alcohol and eyher and dried. 1-[(2-chloroethoxy)methyl]-1,3-dihydro-7-nitro-5-phenyl-2H-1,4-benzodiazepin-2-one of melting point 97°–99° is obtained after recrystallization from alcohol.

EXAMPLE 16

The reaction of 27.1 g of 7-chloro-1,3-dihydro-5-phenyl-2H-4-benzodiazepin-2-one in 300 ml of dimethylformamide with 8 g of sodium methoxide and 19.3 g of chloromethyl 2-chloroethyl ether gives, under the conditions described in Example 51, 7-chloro-1[(2-chloroethoxyl)-methyl]-1,3-dihydro-5-phenyl-2H-1,4-benzodiazepin-2-one (crystallized from methanol) of m.p. 96°–98°.

A second crystal modification shows an m.p. of 128°–130°.

EXAMPLE 17

A solution of 14.5 g of 7-chloro-1,3-dihydro-5-(o-chlorophenyl)-2H-1,4-benzodiazepin-2-one in 50 ml of dimethylformamide is cooled to −20° and treated with 4 g of sodium methoxide. It is stirred at this temperature for 5 minutes and then cooled to −50°. After the dropwise addition of 7 g of chloromethyl 2-chloroethyl ether, the temperature is allowed to rise to −20° within 15 minutes and the mixture is worked up as usual. The crude product is chhromatographed on 250 g of silica gel with 10% ethyl acetate in methylene chloride. After crystallization from ether, the uniform fractions yield 7-chloro-1[2-chloroethoxy)methyl]5(o-chlorophenyl)-1,3-dihydro-2H-1,4-benzodiazepin-2-one of melting point 92°–93°. A second crystal modification melts at 131°–133°.

EXAMPLE 18

A solution of 14 g of 1,3-dihydro-7-nitro-5-phenyl-2H-1,4-benzodiazepin-2-one in 100 ml of dimethylformamide, cooled to −20°, is treated with 4 g of sodium methoxide and stirred for 5 minutes. After cooling to −50°, 9.7 g of 1,2-dichloro-1-methoxy-ethane are added dropwise. The temperature is allowed to rise to −10° within 30 minutes. After the usual working up, the crude product is crystallized from methanol.

After recrystallization from methylene chloride-methanol, there is obtained pure 1-(2-chloro-1-methoxy-ethyl)-1,3-dihydro-7-nitro-5-phenyl-2H-1,4-benzodiazepin-2-one, melting point 162°–164°.

EXAMPLE 19

The reaction of 27.1 g of 7-chloro-1,3-dihydro-5-phenyl-2H-1,4-benzodiazepin-2-one with 8 g of sodium methoxide and 19.5 g of 1,2-dichloro-1-methoxy-ethane as described in Example 18 gives, after recrystallization from methylene chloride-methanol, pure 7-chloro-1-[2-chloro-1-methoxyethyl]-1,3-dihydro-5-phenyl-2H-1,4-benzodiazepin-2-one, melting point 152°–155°.

EXAMPLE 20

A stirred suspension of 36.3 g of 7-chloro-1-[(2-chloroethoxy)methyl]-1,3-dihydro-5-phenyl-2H-1-benzodiazepin-2-one and 22.4 g of potassium phthalimide in 300 ml of dimethylformamide is heated to reflux under a nitrogen atmosphere for 20 minutes. After cooling, it is filtered and the filtrate evaporated in high vacuum. The residue is taken up in benzene, the solution filtered and again evaporated. The residue, dissolved in 100 ml of methanol is treated with 10 ml of ether and, after seeding, crystallized with stirring. Seeding crystals can be obtained by chromatographic purification. After recrystallization from methylene chloride-methanol, there are obtained 29 g of 7-chloro-1,3-dihydro-5-phenyl-1-[(2-phthalmido-ethoxy)methyl]-2H-1,4-benzodiazepin-2-one of m.p. 138°–130°.

14.7 g of 7-chloro-1,3-dihydro-5-phenyl-1-[(2-phthalimidoethoxy)methyl]-2H-1,4-benzodiazepin-2-one are boiled under reflux for 2 hours in 200 ml of alcohol in the presence of 3.5 g of hydrazine hydrate. After cooling to 0°, the phthalazine crystallized out is filtered off by suction and the filtrate evaporated. The residue is partitioned between 2-N acetic acid and ether. The aqueous phase is washed with ether, filtered and made alkaline with 2-N caustic soda. The precipitated base is extracted with ether. The extracts are washed with water, dried over sodium sulphate and evaporated. The residue is taken up in alcohol and adjusted to pH 5-5.5 with ethanolic hydrochloric acid. After evaporation, the residue may be crystallized from acetic ester-methanol yielding 1-[(2-amino-ethoxy)-methy-7-chloro-1,3-dihydro-5-phenyl-2H-1,4-benzodiazepin-2-one hydrochloride, m.p. 147°–150°.

EXAMPLE 21

A solution of 3.63 g of 7-chloro-1-[(2-chloroethoxy)-methy-1]-1,3-dihydro-5-phenyl-2H-1,4-benzodiazepin-2-one in 30 ml of dimethylformamide is treated with 1.65 g of potassium acetate and boiled under reflux in a nitrogen atmosphere for 15 minutes. After cooling to room temperature, 50 ml. of water is added dropwise. The resin which has separated out is separated off and taken up in methylene chloride. The solution, washed with water and dried over sodium sulphate, is evaporated, and the residue purified by chromatography on 100 g. of silica gel with the solvent system methylene chloride:ethyl acetate 4:1. There is obtained 1-[(2-acetoxyethoxy)methyl]-7-chloro-1,3-dihydro-5-phenyl-2H-1,4-benzodiazepin-2-one which, crystalized from ether-hexane, melts at 92°–94°.

8. g. of 1-[(2-acetoxyethoxy)methyl]-7-chloro-1,3-dihydro-5-phenyl-2H-1,4-benzodiazepin-2-one are dissolved warm in 100 ml. of absolute methanol. The solution, treated with 0.2 g. of sodium methoxide, is allowed to stand for 1 hour. After addition of 0.4 ml. of glacial acetic, it is concentrated in vacuum, the residue partitioned between methylene chloride and water and the organic phase dried and evaporated. The residue crystallizes on triturating with ether to yield 7-chloro-1,3-dihydro-1-[(2-hydroxyethoxy)methyl]-5-phenyl-2H-1,4-benzodiazepin-2-one, m.p. 129°–131°.

EXAMPLE 22

A suspension of 16 g. of anhydrous potassium acetate in 300 ml. of toluene and 500 ml. of dimethylformamide is heated with stirring. After distillation of 400 ml. of solvent, 36. g. of 7-chloro-1-[(2-chloro-1-methoxy)ethyl]-1,3-dihydro-5-phenyl-2H-1,4-benzodiazepin-2-one are added. The reaction mixture is heated to reflux under a nitrogen atmosphere for 5 minutes. After cooling to 5°, 800 ml of water are added and the resin which has separated out is separated off. This is taken up in methylene chloride, the solution washed with water, dried over sodium sulphate and evaporated. From the solution of the residue in ether, there first of all crystallize 4 g of 7-chloro-1,3-dihydro-1-[(2-hydroxy-1-methoxy)ethyl]-5-phenyl -2H-1,4-benzodiazepin-2-one. The mother liquid is boiled up with a little active charcoal, filtered, treated with hexane and, after seeding, crystallized. Seeding crystals of pure 1-[(2-acetoxy-1-methoxy)-ethyl]-7-chloro-1,3-dihydro-5-phenyl-2H-1, 4-benzodiazepine-2-one with m.p. 110°–111° (from alcohol) can be obtained by chromatography on silica gel with 20% ethyl acetate in methylene chloride.

The product crystallized from the seeded solution melts at 110–111° after recrystallization from alcohol.

3 g of 1-[(2-acetoxy-1-methoxy)ethyl]-7-chloro-1,3 dihydro-5-phenyl-2H-1,4-benzodiazepin-2-one are dissolved hot in 30 ml of methanol and treated with 0.1 g of sodium methoxide. The material crystallizing from the cooled solution overnight is filtered off by suction, washed with methanol and dried. After recrystallization from alcohol, there is obtained 7-chloro-1,3-dihydro-1-[(2-hydroxy-1-methoxy-)ethyl]-5-phenyl-2H-1,4-benzodiazepin-2-one, melting point 157°–159°.

EXAMPLE 23

8 g of sodium methoxide are added to a solution of 28 g of 1,3-dihydro-7-nitro-5-phenyl-2H-1,4-benzodiazepin-2-one in 100 ml of dimethylformamide; cooled to −10°. The mixture is stirred at −10° for 15 minutes and thereupon cooled to −30°. 17 g of chloromethyl methyl sulphide are added dropwise at this temperature, and after the addition, the mixture is stirred without cooling for 4 hours. The reaction mixture is poured onto 500 ml of water and 25 ml of 2-N acetic acid. The aqueous solution is decanted off from the precipitated resin. This is taken up in methylene chloride, the solution washed with water, dried over sodium sulphate and evaporated. After chromatography on 500 g of silica gel with the solvent system methylene chloride: ethyl acetate 4:1, the residue yields 1,3-dihydro-1-[(methylthio)methyl]-7-nitro-5-phenyl-2H-1,4-benzodiazepin-2-one, m.p. 139°–140°. The sulphide melts at 142–143° after recrystallization from alcohol.

EXAMPLE 24

8 g of sodium methoxide are added to a solution of 27 g of 7-chloro-1,3-dihydro-5-phenyl-2H-1,4-benzodiazepin-2-one in 300 ml of dimethylformamide, cooled to −10°. After 10 minutes, 17 g of chloromethyl methyl sulphide are added dropwise. After the mixture has been stirred for 2 hours without cooling, 8 g of sodium methylate and 17 g of chloromethyl methyl sulphide are again successively added at −10°. The reaction mixture is allowed to stir for a further 2 hours without cooling and poured onto 1 liter of water and 50 ml of 2-N acetic acid. The crude product obtained after usual working up is chromatographed on 500 g of silica gel with 10% ethyl acetate in methylene chloride. By crystallization of the homogeneous fractions from other-hexane, there is obtained 7-chloro-1,3-dihydro-1-[(methylthio)methyl]-5-phenyl-2H-1,4-benzodiazepin-2-one, m.p. 115°–117°.

EXAMPLE 25

A solution of 15 g of 7-chloro-5-(o-chlorophenyl)-1,3-dihydro-2H-1,4-benzodiazepin-2-one in 150 ml of dimethylformamide, cooled to −10°, is treated with 5 g of a 50% suspension of sodium hydride in mineral oil. The mixture is allowed to stir for 15 minutes, and then 10 g of chloromethyl methyl sulphide are added. After 1 hour, the mixture is poured onto ice-water and the product extracted with ether. The extracts, washed with water and dried over sodium sulphate, are evaporated. The residue obtained is chromatographed on 400 g of silica gel with 20% ethyl acetate in methylene chloride. After crystallization from ether, the uniform fractions yield 7-chloro-5-(o-chlorophenyl)-1,3-dihydro-1-[(methylthio)methyl]-2H-1,4-benzodiazepin -2-one which melts at 127°–129° after recrystallization from ethyl acetate-hexane.

EXAMPLE 26

25 ml of 15% peracetic acid are added dropwise to a solution of 7 g of 1,3-dihydro-1-[(methylthio)methyl]-7-nitro-5-phenyl-2H-1,4-benzodiazepin-2-one in 80 ml of methylene chloride, cooled to −10°. After the addition, the mixture is stirred at −10° for 15 minutes. The reaction mixture is washed with 10% soda solution, the methylene chloride phase separated off, dried and evaporated. Crystallization of the residue from ethyl acetate yields 1,3-dihydro-1-[(methylsulphinyl)methyl]-7-nitro-5-phenyl-2H-1,4-benzodiazepin-2-one, m.p. 190°–192°.

EXAMPLE 27

A solution of 10 g of 7-chloro-1,3-dihydro-1-[methylthio) - methyl]-5-phenyl-2H-1, 4-benzodiazepin-2-one in 100 ml of methylene chloride is cooled to −10° and treated dropwise with 15 ml of 40% peracetic acid. After 15 minutes, the reaction mixture is washed with 10% soda solution, dried and evaporated. Chromatography of the residue on 200 g of silica gel with 10% alcohol in ethyl acetate gives, after crystallization from ethyl acetate/hexane, 7-chloro-1,3-dihydro-1-[(methylsulphinyl) methyl]-5-phenyl-2H-1,4-benzodiazepin-2-one, m.p. 158°–159°.

EXAMPLE 28

5 ml of 40% peracetic acid are added dropwise to a solution of 7.5 g of 7-chloro-5-(o-chlorophenyl)-1,3-dihydro-1-[(methylthio)-methyl]-2H-1,4-benzodiazepin-2-one in 50 ml of methylene chloride, cooled to −20°. After 10 minutes the reaction solution is washed out with 10% soda solution, dried over sodium sulphate and evaporated. Crystallization of the residue from ethyl acetate-ether yields 7-chloro-5-(o-chlorophenyl)-1,3-dihydro-1-[(methylsulphinyl) methyl]-2H-1,4-benzodiazepin -2-one which melts at 150°–152° after recrystallization from ethyl acetate-ether.

EXAMPLE 29

After addition of 6 ml of 40% peracetic acid, a solution of 3.75 g of 1,3-dihydro-1-[(methylsulphinyl) methyl]-7-nitro-5-phenyl-2H-1,4-benzodiazepin-2-one in 50 ml of methylene chloride is stirred at room temperature for 2 hours. The crude product obtained after usual working up crystallizes from alcohol-methylene chloride to yield 1,3-dihydro-1-(methylsulphonyl)-methyl-7-nitro-5-phenyl-2H-1,4-benzodiazepin-2-one which melts at 190°–192° after recrystallization from the same solvent mixture.

EXAMPLE 30

The analogous oxidation to that in Example 29 of 3.5 g of 7-chloro-1,3-dihydro-1-[(methylsulphinyl)methyl]-5-phenyl-2H-1,4-benzodiazepin-2-one with 6 ml of 40% peracetic acid in 50 ml of methylene chloride gives 7-chloro-1,3-dihydro-1-[(methylsulphonyl)methyl]-5-phenyl-2H-1,4-benzodiazepin-2-one which displays a m.p. of 162°–164° after recrystallization from ethyl acetateether.

EXAMPLE 31

In the same manner as in Example 29, by oxidation of 7-chloro-5-(o-chlorophenyl)-1,3-dihydro-1-[(methylsulphinyl) methyl]-2H-1,4-benzodiazepin-2-one there is obtained 7-chloro-5-(o-chlorophenyl)-1,3-dihydro-1[(methylsulphonyl)-methyl]-2H-1,4-benzodiazepin-2-one which crystallizes from alcohol with a molecule of solvent and melts at 110°–115° with decomposition.

EXAMPLE 32

A solution of 28.7 g of 7-chloro-1,3-dihydro-5-phenyl-2H-1,4-benzodiazepin-2-one 4-oxide in 200 ml of dimethylformamide is treated as –20° with 8.1 g of sodium methoxide and stirred for 5 minutes. 12 ml of chlorodimethyl ether are added dropwise with stirring at –20°. After the addition, the mixture is allowed to stir without cooling for 30 minutes. The reaction mixture is poured onto 1 l. of water and worked up as usual. Crystallization of the crude product by seeding from methanolether gives 7-chloro-1,3-dihydro-1-(methoxymethyl)-5-phenyl-2H-1,4-benzodiazepin-2-one 4-oxide which melts at 164-166° after recrystallization from alcohol. Seeding crystals are obtained by chromatography on silica gel with the solvent system methylene chloride: ethyl acetate 1:1.

EXAMPLE 33

75 ml of 40% peracetic acid are added to a solution of 50 g of 1,3-dihydro-1-(methoxymethyl)-7-nitro-5-phenyl-2H-1,4-benzodiazepin-2-one in 300 ml of methylene chloride. After 24 hours standing at room temperature, the solution is washed out with 10% soda solution, dried over sodium sulphate and evaporated. Crystalliziation to the residue from methylene chloride-ethyl acetate yields 1,3-dihydro-1-(methoxymethyl)-7-nitro-5-phenyl-2H-1,4-benzodiazepin-2-one 4-oxide which displays a m.p. of 212°–215° after recrystallization from the same solvent mixture.

EXAMPLE 34

17.5 g of 1,3-dihydro-1-(methoxymethyl)-7-nitro-5-phenyl-2H-1,4-benzodiazepin-2-one 4-oxide are heated to boiling in a mixture of 180 ml of acetic anhydride and 300 ml of toluene. 200 ml of the solvent mixture are distilled off within 4 hours. The remaining solution is evaporated in vacuum, the residue taken up in methylene chloride, the solution washed with soda solution, dried and evaporated. Crystallization of the crude product obtained from methylene chloride-ether gives 3-acetoxy-1,3-dihydro-1(methoxymethyl)-7-nitro-5-phenyl-2H-1,4-benzodiazepin-2-one which, recrystallized from ethyl acetate-hexane, melts at 163°–165°.

A solution of 26 g of 3-acetoxy-1,3-dihydro-1-(methoxymethyl)-7-nitro-5-phenyl-2H-1,4-benzodiazepin-2-one in 400 ml of tetrahydrofuran and 200 ml of methanol is treated dropwise at –20° with 70 ml of 2-N caustic soda. After the addition, the mixture is stirred for 15 minutes, buffered to pH 6 by addition of glacial acetic and concentrated in vacuum. The residue is partitioned between water and methylene chloride, the methylene chloride phase dried and evaporated. Crystallization of the crude product from methylene chloride-ether yields 1,3-dihydro-3-hydroxy-1-(methoxymethyl)-7-nitro-5-phenyl-2H-1,4-benzodiazepin-2-one, m.p. 160°–162°.

EXAMPLE 35

The reaction described in Example 34 of 3.3 g of 7-chloro-1,3-dihydro-1-(methoxymethyl)-5-phenyl-2H-1,4-benzodiazepin-2-one 4-oxide with 30 ml of acetic anhydride in 50 ml of toluene and crystallization of the crude product from ether yields 2.6 g of 3-acetoxy-7-chloro-1,3-dihydro-1-(methoxymethyl)-5-phenyl-2H-1,4-benzodiazepin-2-one of m.p. 130°–132°. The product melts at 131°–133° after recrystallization from ether.

6.3 g of 3-acetoxy-7-chloro-1,3-dihydro-1-(methoxymethyl)-5-phenyl-2H-1,4-benzodiazepin-2-one are dissolved warm in 200 ml of methanol. After cooling, 1.8 g of sodium methoxide are added. After 15 minutes, 2.5 ml of glacial acetic are added and the mixture is evaporated in vacuum. The residue is partitioned between methylene chloride and bicarbonate solution, the methylene chloride solution dried and evaporated. Crystallization from alcohol gives 7-chloro-1,3-dihydro-3-hydroxy -1-(methoxymethyl)-5-phenyl-2H-1,4-benzodiazepin-2-one, m.p. 138°–139°.

EXAMPLE 36

0.8 ml of phsophorus trichloride are added to a solution of 1 g of 1,3-dihydro-1-(methoxymethyl)-7-nitro-5-phenyl-2H-1,4-benzodiazepin-2-one 4-oxide in 15ml of methylene chloride. After an hour standing at room temperature, the solution is washed dwith 10% soda solution, dried over sodium sulphate and evaporated. Crystallization of the residue from alcohol gives 1,3-dihydro-1-(methoxymethyl)-7-nitro-5-phenyl-2H-1,4-benzodiazepin-2-one, m.p. 139°–141°.

EXAMPLE 37

12 ml of 0.5-molar solution of bromine in chloroform are added to a solution of 0.95 g of 7-chloro-1-(methoxymethyl)-5-phenyl-1,3,4,5-tetrahydro-2H-1-4-benzodiazepin-2-one in 15 ml of chloroform, cooled to –10°. After the mixture has been stirred at 0°–5° for 30 minutes, 25 ml of 2-N caustic soda are added and stirred for 30 minutes. The chloroform phase is separated off, washed with dilute caustic soda and water, dried and evaporated. The residue is chromatographed on 30 g of silica gel with 10% ethyl acetate in methylene chloride to yield 7-chloro-1,3-dihydro-1-(methoxymethyl)-5-phenyl-2H-1,4-benzodiazepin-2-one.

The starting material can be manufactured as follows.

4.5 g of zinc dust are introduced portionwise into a solution of 3.3 g of 7-chloro-1,3-dihydro-1-(methoxymethyl)-5-phenyl-2H-1,4-benzodiazepin-2-one 4-oxide in 40 ml of methylene chloride and 10 ml of glacial acetic. After completed addition, the mixture is stirred for 30 minutes, filtered off and the filtrate washed with aqueous ammonia and with water, the methylene chloride solution dried and evaporated. Crystallization of the residue from alcohol gives 2.4 g of 7-chloro-1,3,4,5-tetrahydro-1-(methoxymethyl)-5-phenyl-2H-1,4-benzodiazepin-2-one of m.p. 135°–136°. The melting point rises to 136°–138° by recrystallization from alcohol.

EXAMPLE 38

0.67 g of 7-chloro-4-hydroxy-1-(methoxymethyl)-5-phenyl-1,3,4,5-tetrahydro-2H-1,4-benzodiazepin-2-one and 0.63 g of dicyclohexylcarbodiimide are boiled under reflux in 20 ml of toluene for 16 hours. The dicyclohexylurea is filtered off by suction and the filtrate extracted three times with 2-N hydrochloric acid. The extracts are made alkaline with ammonia and extracted with methylene chloride. The dried extracts are evaporated and the residue chromatographed on 15 g of silica gel with 10% acetic ester in methylene chloride, whereby there is obtained in non-crystalline form pure 7-chloro-1,3-dihydro-1-(methoxymethyl)-5-phenyl-2H-1 4-benzodiazepin-2-one.

The starting material can be manufactured as follows.

3.3 g of 7-chloro-1,3-dihydro-1-(methoxymethyl)-5-phenyl -2H-1,4-benzodiazepin-2-one 4-oxide are hydrogenated at atmospheric pressure and room temperature in 30 ml of glacial acetic in the presence of 0.3 g of platinum oxide. After uptake of 400 ml of hydrogen, it is separated off from the catalyst and evaporated. The residue is taken up in benzene and the solution extracted with 2-N hydrochloric acid. The benzene phase, which is thereupon washed with water, is dried and evaporated. Crystallization of the residue from methanol yields 1.1 g of 7-chloro-4-hydroxy-1-(methoxymethyl)-5-phenyl-1,3,4,5-tetrahydro-2H-1,4-benzodiazepin -2-one of m.p. 168°–172°. After recrystallization from methanol, the pure product melts at 173°–175°.

The hydrochloric acid extracts are made alkaline with soda solution and extracted with methylene chloride. The dried extracts are evaporated and the residue likewise crystallized from methanol. There are obtained 1.4 g of 7-chloro-1-(methoxymethyl)-5-phenyl-1,3,4,5-tetrahydro-2H-1,4-benzodiazepin-2-one.

EXAMPLE 39

An aqueous solution of 0.37 g of 2-amino-2'-benzoyl-4'-chloro-N-(methoxymethyl)-acetanilide hydrochloride is made alkaline with dilute ammonia and the base which has separated out is extracted with methylene chloride. The extracts, dried over sodium sulphate, are evaporated and the residue boiled up in 10 ml of methanol. After repeated evaporation, there is obtained in non-crystalline form 7-chloro-1,3-dihydro-1-(methoxymethyl)-5-phenyl-2H-1,4-benzodiazepin-2-one.

The starting material can be manufactured as follows.

2.2 g of sodium hydride suspension (50% in mineral oil) are added to a solution of 12.7 g of 2'-benzoyl-2-(benzyloxycarbonyl)amino-4'-chloro-acetanilide in 150 ml of dimethylformamide, cooled to −10°. After 15 minutes stirring, 3.6 g of chlorodimethyl ether are added dropwise at −10°. After the addition, the mixture is further stirred without cooling for 1 hour. The reaction mixture is poured onto 1 liter of water and repeatedly extracted with ether. The dried ether extracts are evaporated and the residue obtained chromatographed on 300 g of silica gel with 10% acetic ester in methylene chloride to yield 2'-benzoyl-2-(benzyloxycarbonyl)amino-4'-chloro-N-methoxymethyl-acetanilide.

2.4 g of 2'-benzoyl-2-(benzyloxycarbonyl)-amino-4'-chloro-N-(methoxymethyl)acetanilide and hydrogenated in the presence of 500 mg of palladium-charcoal (5%) and 360 mg of hydrogen chloride. The hydrogen uptake comes to a standstill after 30 minutes. The catalyst is filtered off and the filtrate evaporated in vacuum at 30°. The residue crystallizes on triturating with methylene chloride-ethyl acetate-ether. After re-solution from methylene chloride-acetic ester, there is obtained 2-amino -2'-benzoyl-4'-chloro-N-(methoxy-methyl)-acetanilide hydrochloride of melting point 117°–125°.

EXAMPLE 40

1 g of 2'-benzoyl-4'-chloro-N-(methyloxymethyl)-2-phthalimide -acetanilide are boilde under reflux in 30 ml of alcohol in the presence of 0.4 ml. of hydrazine hydrate for 1 ½ hours. After cooling, it is filtered off by suction from phthalazine which has crystallized out, the filtrate is evaporated, the residue taken up in ether, the solution obtained once more filtered and the residue remaining after evaporation chromatographed on 15 g of silica gel with 10% acetic ester in methylene chloride to yield pure 7-chloro-1,3-dihydro-1-(methoxymethyl)-5-phenyl-2H-1,4-benzodiazepin-2-one.

The starting material can be manufactured as follows.

1.5 g of sodium hydride suspension (50% in mineral oil) are added to a solution of 8.4 g of 2'-benzoyl-4'-chloro-2-phthalimide -acentanilide (m.p. 218°–220°) in 150 ml of dimethylformamide, cooled to −10°. After the mixture has been stirred for 15 minutes, 2.3 ml of chlorodimethyl ether are added dropwise at −10°. After the addition, the temperature is allowed to rise to room temperature within 30 minutes and the reaction mixture is poured onto 500 ml of water and 10 ml of 2-N acetic acid. The flocculated material is separated off, taken up in methylene chloride, the solution dried and evaporated. The residue is chromatographed on 200 g of silica gel with 10% acetic ester in methylene chloride. The homogenous fractions crystallize on triturating with ether to yield pure 2'-benzoyl-4'-chloro-N-(methoxymethyl)-2-phthalimide-acetanilide, m.p. 150°–152°.

EXAMPLE 41

A solution of 1.5 g of chromium trioxide in 1.5 ml of water is diluted with 15 ml of glacial acetic and treated portionwise at 20° with 1.8 g of 2-aminomethyl-5-chloro-1(methoxymethyl) -3-phenylindole hydrochloride. After the addition, it is stirred at room temperature of 1 ½ hours. With addition of ice, it is made alkaline with conc. ammonia and the bases are extracted with methylene chloride. The extracts, dired with sodium sulphate, are evaporated and the residue chromatographed on 40 g of silica gel with 10% acetic ester in methylene chloride, whereby there is obtained pure 7-chloro-1,3-dihydro-1-(methoxymethyl)-5-phenyl-2H-1,4-benzodiazepin-2-one.

The starting material can be manufactured as follows.

8.1 g of sodium methylate are added to a solution of of 5-chloro-3-phenylindole-2-carboxylic acid ethyl ester in 150 ml of dimethylformamide, cooled to −20°. After 10 minutes, it is coolde to −40° and 12 ml of chlorodimethyl ether are added dropwise. The temperature is allowed to rise to 10° within 30 minutes, the mixture is poured onto water, the oil which has separated out is separated off, the aqueous phase is extracted with hexane and the extracts are combined with the oil. The dried solution is evaporated and the residue dissolved in 100 ml of ether. This solution is added dropwise at 0°–5° to a suspension of 17 g of lithium aluminium hydride in 150 ml of ether. After the addition, the mixture is allowed to stir without cooling for 15 minutes and hydrolyzed by dropwise addition of 35 ml of water. The precipitate is filtered off by suction, the filtrate dried with sodium sulphate and evaporated. Crystallization of the residue from ether-hexane yields 18.6 g of 5-chloro-1-(methoxymethyl)-3-phenylindole-2-methanol which melts at 135–136° after recrystallization from ether-hexane.

37 g of manganese dioxide are added to a solution of 6.7 g of 5-chloro-1-(methoxymethyl)-3-phenylindole-2-methanol in 150 ml of methylene chloride. After 4 hours, a further 30 g of manganese dioxide are introduced into this stirred suspension. It is then further stirred for 20 hours. After filtration through Celite, the filtrate is concentrated and the residue crystallized from alcohol. There are obtained 5.9 g of needles of 5-chloro-1-(methoxymethyl)-3-phenylindole-2-carboxaldehyde of m.p. 104°–105°.

A mixture of 5.8 g of 5-chloro-1-(methoxymethyl)-3-phenylin-dole-2-carboxaldehyde, 3.9 g of potassium hydroxide, 4.2 g of hydroxylamine hydrochloride, 60 ml of alcohol and 6 ml of water is boiled under reflux for 45 minutes. On treating the reaction mixture with water, 5-chloro-1-(methoxymethyl)-3-phenyl-indole-2-carboxaldehyde oxime is obtained in crystalline form. After cooling to 0°, the crystals are filtered off by suction, washed with cold water and dried, (5.7g). M.p. 155°–156° after recrystallization from alcohol.

5.5 g of 5-chloro-1-(methoxymethyl)-3-phenylindole-2-carboxal-doxime are introduced portionwise into a stirred suspension of 3 g of lithium aluminium hydride in 150 ml of ether. The reaction mixture is heated to reflux for 2 hours and then allowed to stand overnight. It is hydrolyzed by dropwise addition of 15 ml of water. The inorganic material is filtered off by suction, the filtrate dried with sodium sulphate and evaporated. The solution of the residue in alcohol is adjusted to pH 4-5 with alcoholic hydrochloric acid, concentrated in vacuum and treated with ether up to incipient crystallization. There are obtained 3.9 g of 2-aminomethyl-5-chloro-1l(methoxymethyl)-3-phenylindole hydrochloride which melts at 186°–187° after recrystallization from methanol-ether.

EXAMPLE 42

0.8 g of sodium hydride suspension (50% in mineral oil) are introduced into a solution of 3.42 g of 7-chloro-1,3-dihydro-5-phenyl-2H-1,4-benzodiazepin-2-one-3-carboxylic acid ethyl ester in 30 ml of dimethylformamide, cooled to −10°. After the mixture has been stirred at −10° for 30 minutes, it is cooled to −40° and 1.3 ml of chlorodimethyl ether are added. The temperature is allowed to rise to −10° within 30 minutes and the reaction mixture is poured onto 100 ml of water and 10 ml of 2-N acetic acid. The flocculated product is separated off and taken up in methylene chloride. The dried methylene chloride solution is evaporated and the residue crystallized from methylene chloride-ether to yield 7-chloro-1,3-dihydro-1-(methoxymethyl)-5-phenyl-2H-1,4-benzodiazepin-2-one-3-carboxylic acid ethyl ester which melts at 161°–164° after recrystallization from methylene chloride-ether.

EXAMPLE 43

3.9 g of 7-chloro-1,3-dihydro-1-(methoxymethyl)-5-phenyl-2H-1,4-benzodiazepin-2-one-3-carboxylic acid ethyl ester are dissolved in 40 ml of dioxane and stirred under a nitrogen atmosphere at room temperature for 6 hours in the presence of 6 ml of 2-N caustic soda and 30 ml of water. The reaction mixture is shaken out with ehter, the aqueous phase separated off and acidified with 2-N hydrochloric acid until the precipitated material again goes into solution. It is thereupon made alkaline with ammonia and the base extracted with methylene chloride. After chromatographic purification of the crude base, there is obtained 7-chloro-1,3-dihydro-1-(methoxymethyl)-5-phenyl-2H-1,4-benzodiazepin-2-one.

EXAMPLE 44

A solution of 9.7 g of 7-chloro-1,3-dihydro-1-(methoxymethyl)-5-phenyl-2H-1,4-benzodiazepin-2-one-3-carboxylic acid ethyl ester in 50 ml of abs. tetrahydrofuran is added to a solution of 0.5 g of sodium in 50 ml of absolute alcohol. A dry stream of air is led into the stirred solution at 10°–15° for 4 hours. After addition of 2 ml of glacial acetic, the mixture is concentrated in vacuum and the residue partitioned between water and methylene chloride. The methylene chloride phase is separated off, dried over sodium sulphate and evaporated. By crystallization from alcohol, the residue yields 7-chloro-1,3-dihydro-2-hydroxy-1-(methoxymethyl)-5-phenyl-2H-1,4 benzodiazepin-2-one-3-carboxylic acid ethyl ester, m.p. 187°–189°.

EXAMPLE 45

A solution of 9 g of 7-chloro-1,3-dihydro-3-hydroxy-1-(methoxymethyl)-5-phenyl-2H-1,4-benzodiazepin-2-one-3-carboxylic acid ethyl ester in 75 ml of dioxane is treated with 14 ml of 2-N caustic soda and 60 ml of water and stirred at 26°–28° for 20 hours. The reaction mixture is shaken out with 150 ml of ether, the aqueous phase separated off, adjusted to pH 7-8 with 2-N acetic acid, washed out twice with 50 ml of ether each time, separated off and concentrated to 25 g in vacuum at 40°–50°. By addition of 50 ml of acetone, there are obtained 7.5 g of crystalline sodium salt.

0.5 g of this salt are boiled under reflux in 10 ml of glacial acetic for 10 minutes. After evaporation in vacuum, the residue is partitioned between bicarbonate solution and methylene chloride. The methylene chloride phase is dried and evaporated. Crystallization of the residue from alcohol yields 7-chloro-1,3-dihydro-3-hydroxy-1-(methoxymethyl)-5-phenyl-2H-1,4-benzodiazepin-2-one, m.p. 136°–138°.

EXAMPLE 46

10.8 g of sodium methoxide are added to a solution of 28 g of 1,3-dihydro-7-nitro-5-phenyl-2H-1,4-benzodiazepin-2-one in 150 ml of dimethylformamide, cooled to −10°. The reaction mixture is stirred for 5 minutes and thereupon cooled to −40°. At this temperature, 29.7 g of chloromethyl trichloroethyl ether are added dropwise. After the addition, the temperature is allowed to rise to 0° within 30 minutes and the reaction mixture is poured onto 1 liter of water. It is decanted off from the resin which has separated out. This is taken up in methylene chloride, the solution washed with water, dried over sodium sulphate and evaporated. The residue is taken up in ether, starting material crystallizing out. The evaporated mother liquor is chromatographed on 500 g of silica gel with 5% acetic ester in methylene chloride. By crystallization of the uniform fractions from alcohol, there is obtained 1,3-dihydro-7-nitro-5-phenyl-1[(2,2,2-trichloroethoxy)methyl]-2H-1,4 -benzodiazepin -2-one m.p. 113°–118°.

EXAMPLE 47

A solution of 36.4 g of 7-chloro-1-[(2-chloro-1-methoxy) ethyl]-1,3-dihydro-5-phenyl-2H-1, 4-benzodiazepin-2-one in 200 ml of methylene chloride is treated with 50 ml of 40% peracetic acid. The solution is allowed to stand at room temperature for 2 days and thereupon washed out with 10% soda solution. The dried methylene chloride phase is evaporated and, after addition of ether, crystallized to yield 7-chloro-1-[(2-chloro-1-methoxy) ethyl]-1,3-dihydro-5-phenyl-2H-1,4-benzodiazepin-2-one 4-oxide, m.p. 213°–215°. The product recrystallized from acetic esteralcohol melts at 214°–215°.

EXAMPLE 48

A mixture of 30 g of 7-chloro-1-[2-chloro-1-methoxy) ethyl]-1,3-dihydro-5-phenyl-2H-1,4-benzodiazepin-2-one 4-oxide, 200 ml of acetic anhydride and 250 ml of toluene is heated for 4 hours so that toluene slowly distills. After evaporation in vacuum, the residue is crystallized from methylene chlorideether and recrystallized from alcohol to yield 3-acetoxy-7-chloro -1](2-chloro-1-methoxy)ethyl]-1,3-dihydro-5-phenyl-2H-1, 4-benzodiazepin-2-one, m.p. 193°–195°.

EXAMPLE 49

A mixture of 18 g of 3-acetoxy-7-chloro-1-[(2-chloro-1-methoxy)ethyl]-1,3-dihydro-5-phenyl-2H-1,4-benzodiazepin-2-one, 200 ml of methanol and 2 ml of triethylamine is boiled under reflux for 7 hours. The solution is concentrated up to incipient crystallization and then cooled to yield 7-chloro-1-[(2-chloro-1-methoxy)ethyl]-1,3-dihydro-3-hydroxy-5-phenyl-2H-1,4-benzodiazepin -2-one which recrystallized from aceti- ester, melts at 191°–193°.

EXAMPLE 50

A mixture of 10 g of 7-chloro-1-[(2-chloroethoxy)methyl]-1,3-dihydro-5-phenyl-2H-1,4-benzodiazepin-2-one, 20 ml of pyrrolidine, 2 g of sodium iodide and 100 ml of dioxane are boiled under reflux for 5 hours. The residue obtained after evaporation in vacuum is partitioned between ehter and 10% soda solution. The ether phase is separated off, dried and evaporated. The residue is chromatographed on 150 g of silica gel with the solvent system benzene: acetone: triethylamine 16:3:1. The thin layer chromatographically pure fractions are combined and adjusted to pH 6 with alcoholic hydrochloric acid. After evaporation in vacuum, the residue is crystallized from acetone/ether to yield 7-chloro-1,3-dihydro-5-phenyl-1-{[2-(1-pyrrolidinyl)-ethoxy]methyl}-2H-1,4-benzodiazepin-2-one hydrochloride, m.p. 163°–166°.

EXAMPLE 51

1 g of 1-[(2-amino-ethoxy)methyl]-7-chloro-1,3-dihydro -5-phenyl-2H-1,4-benzodiazepin-2-one hydrochloride are dissolved in 5 ml of 30% formaldehyde solution and allowed to stand at room temperature for 2 hours. It is thereupon diluted with 20 ml of methanol and hydrogenated in the presence of 1 g of Raney-nickel for 3 hours. After filtering off the catalyst, it is evaporated in vacuum and the residue partitioned between ether and 10% soda solution. The ether phase is separated off, dried and evaporated, finally after addition of benzene. The residue is dissolved in ether and brought to pH 6 with methanolic hydrochloric acid. After repeated evaporation, the residue is crystallized from acetone-ether to yield 7-chloro-1,3-dihydro-1{[2-dimethylamine)ethoxy]-methyl-}5-phenyl-2H-1,4-benzodiazepin-2-one hydrochloride which melts at 175-177° after resolution from acetone-ether.

EXAMPLE 52

A mixture of 14 g of 1,3-dihydro-7-nitro-5-phenyl-2H-1, 4-benzodiazepin-2-one, 50 ml of glacial acetic and 20 ml of ethyl vinyl ether are boiled under reflux for 5 hours. The reaction mixture is evaporated in vacuum and the residue dissolved in methylene chloride. This solution is washed out with 10% soda solution, dried and evaporated. Crystallization of the residue from methylene chloride-ether gives back 10 g of starting material. The mother liquor is evaporated and the residue chromatographed on 100 g of silica gel with 20% acetic ester in methylene chloride. By crystallization from ether there is obtained 1-[(1-ethoxy)-ethyl]-1,3-dihydro-7-nitro-5-phenyl-2H-1,4-benzodiazepin-2-one, m.p. 170°–173°.

EXAMPLE 53

A mixture of 10 g of 7-chloro-1[2-chloroethoxy)-methyl] -1,3-dihydro-5-phenyl-2H-1,4-benzodiazepin-2-one, 2 g of sodium iodide, 20 ml of dimethylamine and 100 ml of dioxane is heated to 110°–115° in an autoclave. After evaporation in vacuum, the residue is partitioned between 10% soda solution and ether. The ether phase is washed with water, dried over sodium sulphate and evaporated, finally after addition of benzene. The residue is dissolved in alcohol. The pH value of the solution is adjusted to 6 with alcoholic hydrochloric acid. The solvent is removed in vacuum and the residue crystallized from acetone-ether to yield 7-chloro-1{[2-(dimethylamino)ethoxy]methyl}-1,3-dihydro-5-phenyl -2H-1,4-benzodiazepin-2-one hydrochloride which melts at 174°–176° after recrystallization from acetone-ether.

EXAMPLE 54

A mixture of 10 g of 7-chloro-1-[(2-chloroethoxy)methyl]-1,3-dihydro-5-phenyl-2H-1,4-benzodiazepin-2-one, 2 g of sodium iodide, 20 ml of methylamine and 100 ml of dioxane is heated to 110°–115° for 4 hours in an autoclave. After evaporation of the volatile portions in vacuum, the residue is partitioned between 10% soda solution and ether-benzene mixture. The organic phase is extracted three times with 2-N acetic acid. The extracts are washed with ether, made alkaline with 2-N caustic soda and extracted with benzene-ether mixture. After evaporation, the extracts, dried over sodium sulphate, yield 5 g of a yellow oil. By chromatography on 120 g of silica gel with the solvent system benzene:ethanol:triethylamine 7:2:1, there are obtained 2.8 g of thin layer chromatographically pure product. On treating an alcoholic solution of the base with an equivalent of oxalic acid in alcohol, crystalline-7chloro-1,3-dihydro-1- [2-

(methylamino)ethoxy]methyl -5-phenyl-2H-1,4-benzodiazepin-2-one oxalate, m.p. 208°–210° is obtained.

EXAMPLE 55

2 g of 4-acetoxy-7-chloro-1(methoxymethyl)-5-phenyl-1,3,4,5-tetrahydro-2H-1,4-benzodiazepin-2-one are boiled under reflux for 30 minutes in 30 ml of alcohol and 5 ml of triethylamine. The residue obtained after evaporation in vacuum is chromatographed on 50 g of silica gel with 10% ethyl acetate in methylene chloride. 1.3 g of 7-chloro-1,5-dihydro-1-(methoxymethyl)-5-phenyl-2H-1,4-benzodiazepin-2-one are first eluted. After crystallization from ether-hexane, this compound shows an m.p. of 126°–129°. Thereafter, 0.4 g of the isomeric 7-chloro-1,3-dihydro-1(methoxymethyl)-5-phenyl-2H-1,4-benzodiazepin-2-one are eluted.

The starting material can be manufactured as follows.

A solution of 3.3 g of 7-chloro-1-(methoxymethyl)-4-hydroxy-5-phenyl-1,3,4,5-tetrahydro-2H-1,4-benzodiazepin-2-one in 20 ml of pyridine is treated with 10 ml of acetic anhydride and allowed to stand at room temperature for 48 hours. After evaporation in vacuum, the residue is partitioned between ether and 2-N hydrochlorid acid. The ether phase is washed with bicarbonate solution and water, dried and evaporated. Crystallization of the residue from ether-hexane yields 3.1 g of 4-acetoxy-7 chloro-1(methoxymethyl)-5-phenyl-1,3,4,5-tetrahydro-2H-1,4-benzodiazepin-2-one of m.p. 95°–103°. The melting point improves to 103°–106° by recrystallization from methanol.

EXAMPLE 56

0.3 g of 7-chloro-1,5-dihydro-1-(methoxymethyl)-5-phenyl-2H-1,4-benzodiazepin-2-one are allowed to stand at room temperature for 30 minutes in a solution of 0.1 g of sodium in 10 ml of alcohol. The reaction mixture is neutralized by addition of glacial acetic and evaporated in vacuum. The residue is partitioned between 10% caustic soda solution and methylene chloride. The residue obtained after evaporation of the dried methylene chloride solution is chromatographed on 20 of silica gel with 10% acetic ester in methylene chloride to yield 7-chloro-1,3-dihydro-1-(methoxymethyl)-5-phenyl-2H-1,4-benzodiazepin-2-one.

EXAMPLE 57

0.4 g of sodium methoxide are added to a solution of 1 g of 7-chloro-1(methoxymethyl)-5-phenyl-4-(p-toluenesulphonyl)-1,3,4,5-tetrahydro -2H-1,4-benzodiazepin-2-one in 20 ml of dimethylformamide. The mixture is stirred for 30 minutes under a nitrogen atmosphere, then neutralized with glacial acetic and evaporated in vacuum. The residue is taken up in ether and extracted three times with 2-N hydrochloric acid. The extracts, washed with ether, are made alkaline with concentrated ammonia and extracted three times with methylene chloride. After evaporation, the dried methylene chloride extracts leave behind 0.6 g of yellow oil which, after chromatography on 20 g of silica gel with 10% acetic ester in methylene chloride, yields 7-chloro-1,3-dihydro-1-(methoxymethyl)-5-phenyl-2H-1,4-benzodiazepin-2-one.

The starting material can be manufactured as follows.

A solution of 3.2 g of 7-chloro-1-(methoxy-5-phenyl-1,3,4,5-tetrahydro-2H-1,4-benzodiazepin-2-one in 20 ml of pyridine is treated with 2.3 g of tosyl chloride and allowed to stand at room temperature for 3 hours. After removal of the pyridine in vacuum, the residue is partitioned between methylene chloride and 2-N hydrochloric acid. The methylene chloride phase is thereupon washed with 10% soda solution and water, dried and evaporated. The crystalline residue is recrystallized from methanol-methylene chloride to yield 7-chloro-1-(methoxymethyl)-5-phenyl-4-(p-toluene-sulphenyl)-1,3,4,5-tetrahydro-2H-1,4-benzodiazepin-2-one, m.p. 218°–220°.

EXAMPLE 58

4.1 g sodium methoxide were added to a solution of 16 g 7-bromo-1,3-dihydro-5-(2-pyridyl)-2H-1,4-benzodiazepin-2-one in 150 ml dimethylformamide, cooled to −10°. After stirring for 10 minutes, the temperature was lowered to −50° and 6 ml chlorodimethyl ether were added. Cooling was discontinued after addition and when the temperature reached 0° the reaction mixture was poured on 1 liter ice-water containing 100 ml and saturated sodium bicarbonate solution. The amorphous precipitate was collected by filtration, washed with water and dissolved in methylene chloride the solution was dried over anhydrous sodiumsulfate and evaporated. The reddish resin obtained was chromatographed on 300 g silica gel with the solvent mixture methylene chloride: ethylacetate 1:1 the fractions purified by thin layer chromatography were combined and evaporated to yield as an amorphous product 7-bromo-1,3-dihydro-1-(methoxymethyl)-5-(2-pyridyl)2H-1,4-benzodiazepin-2-one.

EXAMPLE 59

9.6 g pivaloyl chloride were added dropwise to a solution of 10.3 g 7-chloro-1,3-dihydro-1-[(2-hydroxy-1-methoxy)-ethyl]-5-phenyl-2H-1,4-benzodiazepin-2-one in 125 ml pyridine at 30°–35°. After addition the reaction mixture was stirred for 1 hour at room temperature and then evaporated under reduced pressure. The residue was dissolved in methylene chloride, the solution was dried over sodium sulfate and concentrated. The oil obtained crystallized from hexane to yield 9.2 g crude product with m.p. 95°–100°. Recrystallization from ether/hexane gave 2-(7-chloro-2,3-dihydro-2-oxo-5-phenyl-1H-1,4-benzodiazepin-1-yl)-2-methoxyethyl-pivalate with m.p. 101°–103°.

EXAMPLE 60

The crude product obtained according to Example 59 from 10.3 g 7-chloro-1,3-dihydro-1-[(2-hydroxy-1-methoxy)ethyl]-5-phenyl-2H-1,4-benzodiazepin-2-one and 18.4 g of 3,4,5-trimethoxybenzoylchloride was chromatographed on 600 g silica gel using 20% ethylacetate in methylene chloride. The homogenous fractions were combined, evaporated and crystallized from methylenechloride/hexane to yield 2-(7-chloro-2,3-dihydro-2-oxo-5-phenyl-1H-1,4-benzodiazepin-1-yl)-2-methoxyethyl-3,4,5-trimethoxybenzoate with m.p. 146°–148°.

EXAMPLE 61

In the same way as in the preceding example, Example 60, the reaction of 10.3 g 7-chloro-1,3-dihydro-1-[(2-hydroxyl-1-methoxy) ethyl]-5-phenyl-2H-1,4-benzodiazepin-2-one with 7.8 g cyclopropane carboxylic acid chloride yielded after chromatography on 450 g silica gel using 20% ethylacetate in methylene chloride 2-(7-chloro-2,3-dihydro-2-oxo-5-phenyl-1H-1,4-benzodiazepin-1-yl)-2-methoxyethyl cyclopropane carboxylate, which melted after recrystallization from ethanol at 113°–115°.

EXAMPLE 62

A suspension of 8.0 g N,N'-carbonyl-di-imidazole in 40 ml tetrahydrofuran was stirred for 2 hours at room temperature under nitrogen after addition of 7.8 g p-methoxyphenyl acetic acid; a clear solution of p-methoxyphenyl acetic acid-imidazolide resulted. In the meantime, a solution of sodium imidazolide from 0.16 g sodium and 1.6 g imidazole in 20 ml tetrahydrofuran was prepared by refluxing in an inert atmosphere. After cooling to room temperature a suspension of 8.1 g 7-chloro-1,3-dihydro-1-[(2-hydroxy-1-methoxy)ethyl]-5-phenyl-2H-1,4-benzodiazepin-2-one in 50 ml methylene chloride was added. Then the prepared solution of imidazolide was added at room temperature and the mixture was stirred overnight. The precipitate was filtered and the filtrate was evaporated. The oily residue was dissolved in methylene chloride and the solution was washed with aqueous bicarbonate and water, dried over sodium sulfate and concentrated. The remaining oil was chromatographed on 200 g silica gel with 20% ethylacetate in methylene chloride. The homogenous fraction was crystallized from ether/hexane to yield 7-chloro-1,3-dihydro-1-[1-methoxy-2-(p-methoxyphenylacetoxy)-ethyl]-5-phenyl-2H-1,4-benzodiazepin-2-one, m.p. 95°–97°.

EXAMPLE 63

To a solution of 3.25 g (0.01 mole) of 1,3-dihydro-7-nitro-1-(methoxymethyl)-5-phenyl-2H-1,4-benzodiazepin-2-one in 50 ml of methanol there was added 5 g of wet Raney nickel. The reaction mixture was hydrogenated until the hydrogen uptake ceased. The catalyst was filtered off and the filtrate was evaporated. The residue was crystallized from ethyl acetate/petroleum ether yielding 7-amino-1,3-dihydro-1-(methoxymethyl)-5-phenyl-2H-1,4-benzodiazepin-2-one melting at 146°.

EXAMPLE 64

Tablets of the following compositions are manufactured:

|  | per tablet |
|---|---|
| 1,3-Dihydro-1-(methoxymethyl)-7-nitro-5-phenyl-2H-1,4-benzodiazepin-2-one | 10 mg |
| Corn starch | 53 mg |
| Lactose | 150 mg |
| Gelatin (10% solution) | 6 mg |

The active substance, the corn starch and the lactose are thickened with a 10% gelatin solution. The paste is comminuted, the granulates are brought into a suitable pan and dried at 43°. The dried granulate is led through a comminuting machine and mixed with the following ingredients in a mixer:

| Talc | 6 mg |
| Magnesium stearate | 6 mg |
| Corn starch | 9 mg | and then pressed to tablets of 240 mg.

EXAMPLE 65

Suppositories are manufactured with the following ingredients:

|  | Per 1 g suppository |
|---|---|
| 1,3-Dihydro-1-(methoxymethyl)-7-nitro-5-phenyl-2H-1,4-benzodiazepin-2-one | 10.0 mg |
| Wecobee M (hydrogenated coconut oil) | 97.5 mg |
| Carnauba wax | 1.5 mg |

The Wecobee M and the carnauba wax are melted in a suitable vessel fitted with a glass liner and cooled to 45°. The active substance is added with stirring and stirred up to complete dispersion. The mixture is thereupon poured into suppository molds which ensure a suppository weight of 1 g.

EXAMPLE 66

A parenteral use-form is manufactured with the following ingredients:

|  | per ml |
|---|---|
| 1,3-Dihydro-1-(methoxymethyl)-7-nitro-5-phenyl-2H-1,4-benzodiazepin-2-one | 5 mg |
| Dimethylacetamide | 10% |
| Propyleneglycol | 50% |
| Benzyl alcohol | 1.5% |
| Ethanol | 10% |
| Water for injection ad | 1 ml |

The active substance is dissolved in dimethylacetamide and treated with benzyl alcohol, propyleneglycol, ethanol and water. It is filtered through a candle filter, filled into suitable ampoules, sealed and sterilized.

I claim:
1. A compound of the formula

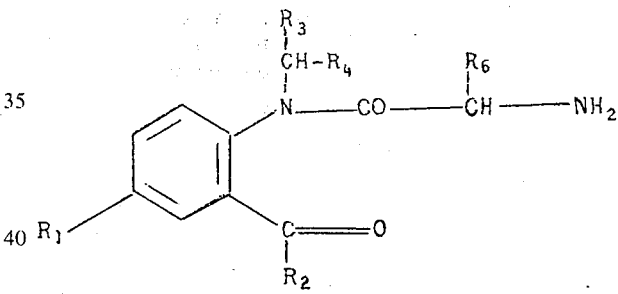

wherein $R_1$ signifies halogen or nitro; $R_2$ signifies phenyl, mono-halo phenyl or pyridyl; $R_3$ signifies hydrogen, lower alkyl, hydroxy-lower alkyl, halo-lower alkyl, acyloxy-lower alkyl, carbalkoxy, mono-lower alkylamine-lower alkyl, or di-lower alkylamino-lower alkyl; $R_4$ signifies lower alkoxy, halo-lower alkoxy, amino-lower alkoxy, mono-lower alkylamino-lower alkoxy, di-lower alkylamino-lower alkoxy, hydroxy-lower alkoxy, alkoxy-lower alkoxy, lower alkylthio, loweralkylsulfinyl or lower alkylsulfonyl and $R_6$ signifies hydrogen or carbalkoxy, $R_4$ being other than amino-lower alkylamino-lower alkoxy or di-lower-alkylamino-lower alkoxy in case $R_3$ stands for carbalkoxy.

2. A compound of the formula

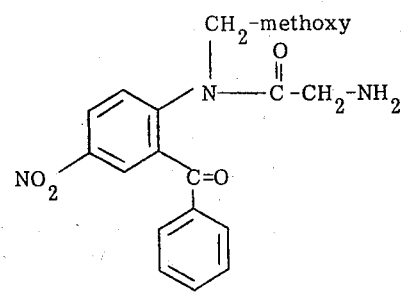

* * * * *